United States Patent
Ebihara et al.

(10) Patent No.: US 10,921,964 B2
(45) Date of Patent: Feb. 16, 2021

(54) MESSAGE INPUT RECEPTION DEVICE, MESSAGE SYSTEM, AND INFORMATION STORAGE MEDIUM

(71) Applicant: KONAMI DIGITAL ENTERTAINMENT CO., LTD., Tokyo (JP)

(72) Inventors: Hisashi Ebihara, Tokyo (JP); Sumie Yogo, Tokyo (JP); Fumiro Igarashi, Tokyo (JP); Nagayo Orihara, Tokyo (JP); Yuta Mizuno, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 315 days.

(21) Appl. No.: 15/293,290

(22) Filed: Oct. 14, 2016

(65) Prior Publication Data

US 2017/0031567 A1    Feb. 2, 2017

Related U.S. Application Data

(63) Continuation of application No. PCT/JP2015/060701, filed on Apr. 6, 2015.

(30) Foreign Application Priority Data

Apr. 14, 2014  (JP) .............................. JP2014-083188

(51) Int. Cl.
   *G06F 3/0484* (2013.01)
   *H04M 1/725* (2021.01)
   *H04L 12/58* (2006.01)

(52) U.S. Cl.
   CPC ........ *G06F 3/04842* (2013.01); *H04L 51/046* (2013.01); *H04M 1/72547* (2013.01)

(58) Field of Classification Search
   CPC .............. G06F 3/04842; H04L 51/046; H04M 1/72547
   See application file for complete search history.

(56) References Cited

U.S. PATENT DOCUMENTS

| 8,676,236 B1 * | 3/2014 | Gautam | ................. H04W 4/14 |
| | | | 455/466 |
| 2008/0152095 A1 * | 6/2008 | Kleindienst | ....... H04M 1/72547 |
| | | | 379/88.13 |

(Continued)

FOREIGN PATENT DOCUMENTS

| JP | 2006149671 A | 6/2006 |
| JP | 2010-162212 A | 7/2010 |

(Continued)

OTHER PUBLICATIONS

Computer generated English translation of the Office Action dated May 9, 2017, for corresponding JP Patent Application No. 2014-083188.

(Continued)

*Primary Examiner* — Jennifer N To
*Assistant Examiner* — Reji Kartholy
(74) *Attorney, Agent, or Firm* — HEA Law PLLC

(57) ABSTRACT

A message input reception device, comprising at least one processor configured to: acquire registered message data representing an object-related registered message which is registered in advance and is set such that a symbol string relating to at least one object is insertable into a prescribed position or is capable of replacing a prescribed portion; identify at least one selected object which is selected by a user from among objects displayed on a screen; and acquire, as an input message input by the user, a message obtained by inserting a symbol string associated with the at least one selected object into the prescribed position of the object- (Continued)

related registered message or replacing the prescribed portion of the object-related registered message with the symbol string.

16 Claims, 18 Drawing Sheets

(56) References Cited

U.S. PATENT DOCUMENTS

| | | | | |
|---|---|---|---|---|
| 2009/0164914 A1* | 6/2009 | Chen | ................... | G06Q 10/107 |
| | | | | 715/753 |
| 2010/0184516 A1* | 7/2010 | Matsumura | ............. | A63F 13/12 |
| | | | | 463/42 |
| 2012/0011256 A1* | 1/2012 | Masuda | ................ | H04W 76/11 |
| | | | | 709/227 |

FOREIGN PATENT DOCUMENTS

| | | |
|---|---|---|
| JP | 4637192 B2 | 2/2011 |
| JP | 2012-043084 A | 3/2012 |
| JP | 2013-205984 A | 10/2013 |

OTHER PUBLICATIONS

Office Action dated Aug. 21, 2018, for corresponding JP Patent Application No. 2017-207171 and computer generated English translation of OA.

Office Action and English translation for corresponding CN Patent Application No. 201580019398.6 ; dated Jul. 1, 2019 ; see pp. 1-20.

* cited by examiner

FIG.10

| REGISTERED MESSAGE ID | REGISTERED BY | REGISTERED MESSAGE |
|---|---|---|
| RM0001 | U001 | LET'S ATTACK <BODY PART> |
| RM0002 | U001 | LET'S ATTACK <BODY PART> LATER |
| RM0003 | U001 | I'M GOING TO USE <ITEM> |
| RM0004 | U001 | PLEASE USE <ITEM> |
| RM0005 | U001 | HELLO, <USER>! |
| RM0006 | U001 | THANK YOU! |
| RM0007 | U002 | LET'S ATTACK <BODY PART> FIRST! |
| ... | ... | ... |

FIG.11

| OBJECT ID | OBJECT TYPE | OBJECT NAME |
|---|---|---|
| OB0001 | BODY PART | HEAD |
| OB0002 | BODY PART | LEFT ARM |
| OB0003 | BODY PART | RIGHT ARM |
| ... | ... | ... |
| OB0101 | ITEM | ITEM X |
| OB0102 | ITEM | ITEM Y |
| OB0103 | ITEM | ITEM Z |
| ... | ... | ... |

FIG.12

| MESSAGE ID | INPUT BY | INPUT DATE AND TIME | MESSAGE | RELATED OBJECT |
|---|---|---|---|---|
| M0001 | U003 | — — — | HI | |
| M0002 | U004 | — — — | LET'S TRY HARD TOGETHER | |
| M0003 | U001 | — — — | LET'S ATTACK LEFT ARM | OB0002 |
| ... | ... | ... | ... | ... |

MESSAGE INPUT RECEPTION DEVICE, MESSAGE SYSTEM, AND INFORMATION STORAGE MEDIUM

CROSS-REFERENCE TO RELATED APPLICATION

The present disclosure contains subject matter related to that disclosed in Japanese Patent Application JP2014-083188 filed in the Japan Patent Office on Apr. 14, 2014 and International Patent Application PCT/JP2015/060701 filed in the Japan Patent Office on Apr. 6, 2015, where the entire contents of each application is hereby incorporated by reference.

BACKGROUND OF THE INVENTION

1. Field of the Invention

The present invention relates to a message input reception device, a message system, and an information storage medium.

2. Description of the Related Art

There has been known a system capable of enabling communication by transmitting and receiving messages among a plurality of users. For example, there has been known a system capable of enabling communication among a plurality of users by transmitting and receiving messages while the plurality of users are playing a game (JP 4637192 B2).

SUMMARY OF THE INVENTION

For example, in a game that proceeds while enabling communication between one user and another user, it is necessary to input messages quickly in accordance with the situation of the game, which is changing every moment.

Hitherto, in such a game, as a message input method, a method in which a message is typed in an input field has been employed. With such an input method, a message having content matching the current situation can be input. However, because it is necessary to input the message each occasion, it can take time to type the message. As a result, for example, the game situation may change during the period in which the message is being input, causing a situation to occur in which the content of the input message does not match the current situation.

In a game such as that described above, as the message input method, a method in which the message is input by selecting a message registered in advance has also been employed. With such an input method, the time taken to input the message can be shortened. However, because only a message having predetermined content can be selected, there is no flexibility in the content of the message, which means that a message having content matching the current situation cannot be input in some cases. In other words, when a message having content matching the current situation has not been registered in advance, a message having content matching the current situation cannot be input.

The present invention has been made in view of the above-mentioned problem. It is an object of the present invention to provide a message input reception device, a message system, a program, and an information storage medium, each capable of shortening the time taken to input a message, while ensuring flexibility relating to the content of the message.

In order to solve the above-mentioned problem, according to one embodiment of the present invention, there is provided a message input reception device, including at least one processor configured to: acquire registered message data representing an object-related registered message which is registered in advance and is set such that a symbol string relating to at least one object is insertable into a prescribed position or is capable of replacing a prescribed portion; identify at least one selected object which is selected by a user from among objects displayed on a screen; and acquire, as an input message input by the user, a message obtained by inserting a symbol string associated with the at least one selected object into the prescribed position of the object-related registered message or replacing the prescribed portion of the object-related registered message with the symbol string.

Further, according to one embodiment of the present invention, there is provided a message system, including at least one processor configured to: acquire registered message data representing an object-related registered message which is registered in advance and is set such that a symbol string relating to at least one object is insertable into a prescribed position or is capable of replacing a prescribed portion; identify at least one selected object which is selected by a user from among objects displayed on a screen; and acquire, as an input message input by the user, a message obtained by inserting a symbol string associated with the at least one selected object into the prescribed position of the object-related registered message or replacing the prescribed portion of the object-related registered message with the symbol string.

BRIEF DESCRIPTION OF THE DRAWINGS

FIG. 10 is a diagram for showing an example of a registered message table.

FIG. 11 is a diagram for showing an example of an object table.

FIG. 12 is a diagram for showing an example of a message table.

DETAILED DESCRIPTION OF THE INVENTION

Now, an exemplary embodiment of the present invention is described in detail with reference to the drawings.

Figure 1:
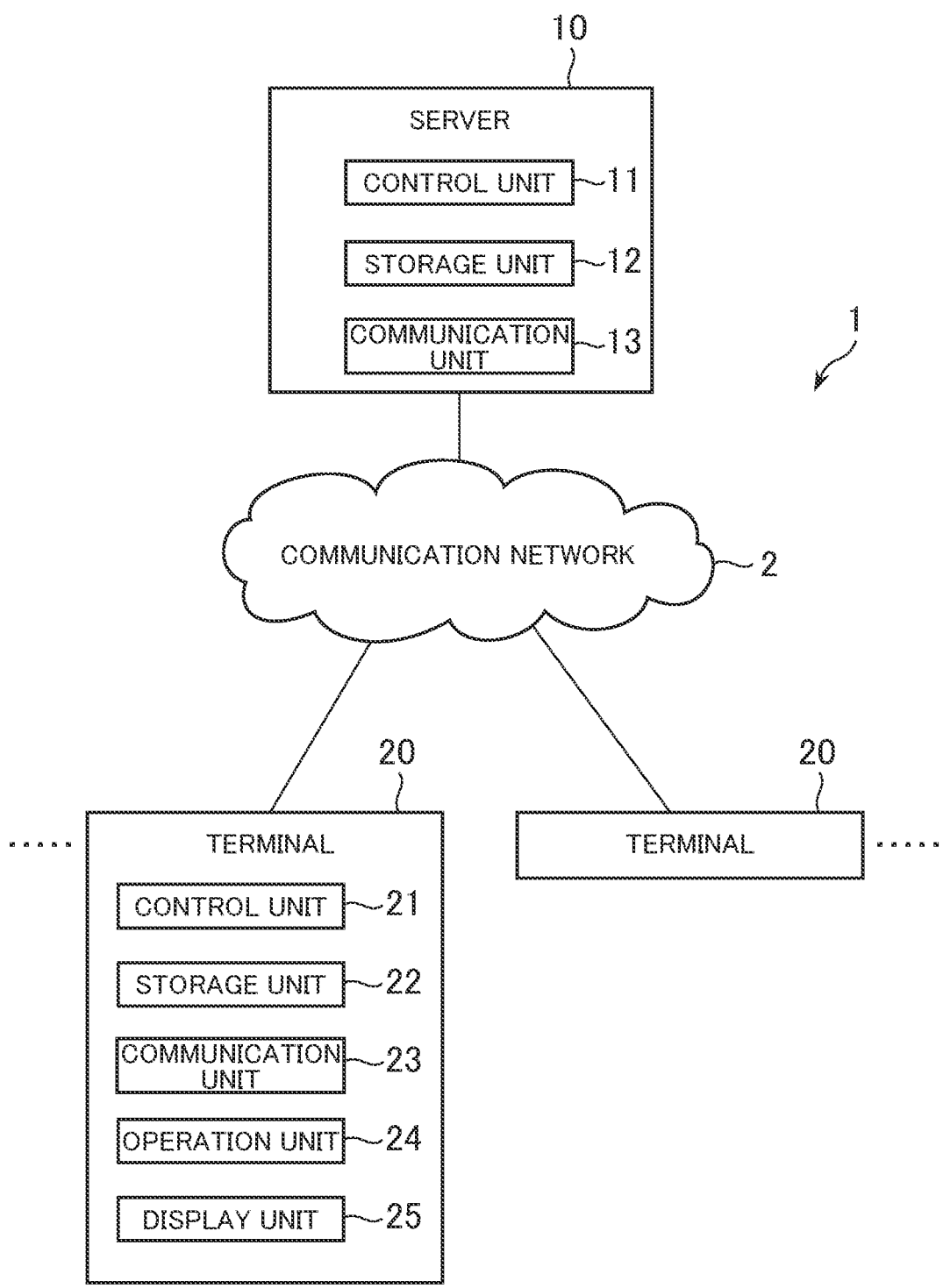
FIG. 1 is a diagram for illustrating an example of an overall configuration of a message system.

FIG. 1 is a diagram for illustrating the overall configuration of a message system according to the embodiment of the present invention. The message system is configured to control transmission and reception of messages among a plurality of users, to thereby enable a chat in which the plurality of users participate. As illustrated in FIG. 1, a message system 1 includes a server 10 and a plurality of terminals 20. The server 10 and each terminal 20 are capable of transmitting and receiving data to and from each other via a communication network 2.

The server 10 is implemented by a server computer. As illustrated in FIG. 1, the server 10 includes a control unit 11, a storage unit 12, and a communication unit 13. The control unit 11 includes one or a plurality of microprocessors etc., and is configured to execute processing based on an operating system or another program. The storage unit 12 includes a main storage unit (e.g., a random-access memory (RAN)) and an auxiliary storage unit (e.g., a hard disk drive or a solid-state drive). The communication unit 13 is for performing data communication via the communication network 2.

The terminals 20 are computers operated by the users. The terminals 20 are implemented by, for example, a mobile phone (including a smartphone), a portable information terminal (including a tablet computer), a desktop computer, a laptop computer, or a game machine (including a consumer game machine or a commercial game machine installed in an amusement facility etc.). As illustrated in FIG. 1, each terminal 20 includes a control unit 21, a storage unit 22, a communication unit 23, an operation unit 24, and a display unit 25.

The control unit 21, the storage unit 22, and the communication unit 23 are the same as the control unit 11, the storage unit 12, and the communication unit 13 of the server 10. The operation unit 24, which is an input device, maybe, for example, a pointing device such as a touch panel. The display unit 25 is, for example, a liquid crystal display panel or an organic electroluminescence (EL) display etc., and is configured to display various types of images based on commands from the control unit 21.

The programs and the data described as being stored in the storage unit 12 or the storage unit 22 are supplied to, for example, the server 10 or the terminals 20 via the communication network 2. The server 10 or the terminals 20 may also include a component for reading programs or data stored in a computer-readable information storage medium (e.g., a memory card or an optical disc). The programs and data may be supplied to the server 10 or the terminals 20 via the information storage medium. Further, the programs and the data described as being stored in the storage unit 12 or the storage unit 22 may be stored in a storage unit of a device accessible from the server 10 or the terminals 20 via the communication network 2.

Next, the chat executed by the message system 1 is described. In this case, an example is described in which four users playing a game are chatting while working together in order to defeat a shared enemy. The four users as referred to here as a user A, a user B, a user C, and a user D. In the following, when it is not particularly necessary to distinguish among the users A to D, the users A to D are simply referred to as a "user". The "user" is a person who is inputting a message (person operating the terminal 20), and may also be referred to as a "player" of the game.

Figure 2:
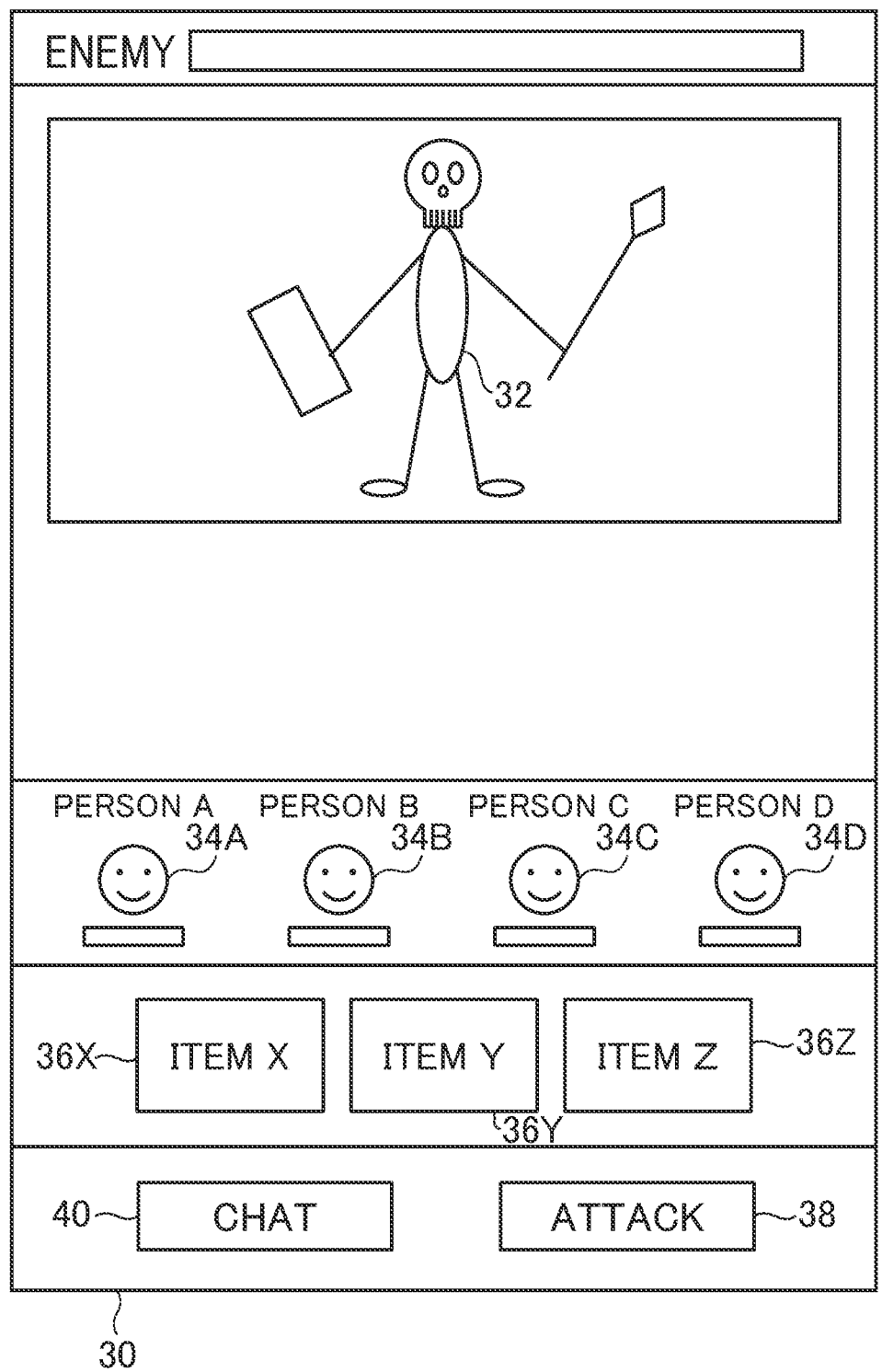
FIG. 2 is a diagram for illustrating an example of a game screen.

FIG. 2 is a diagram for illustrating an example of a game screen displayed on the display unit 25 of each terminal 20. In this example, the game screen displayed on the terminal 20 of the user A is described. The terminal 20 described in this example includes a touch panel arranged to be overlaid on the display unit 25, and is configured to enable an object displayed on the game screen to be selected by the user touching his or her finger on the object displayed on the game screen.

As illustrated in FIG. 2, a game image showing how a game is progressing is displayed on a game screen 30. An enemy object 32 representing a shared enemy of the users A, B, C, and D is displayed on the game screen 30 illustrated in FIG. 2. The enemy object 32 is an image representing an enemy.

User objects 34A, 34B, 34C, and 34D respectively representing the user A, the user B, the user C, and the user D, are also displayed on the game screen 30. The user objects 34A to 34D are avatar images respectively representing the users A to D. In the following, when it is not necessary to distinguish among the user objects 34A to 34D, the user objects 34A to 34D are simply referred to as a "user object 34".

Item objects 36X, 36Y, and 36Z respectively representing items X, Y, and Z are also displayed on the game screen 30. The item objects 36X to 36Z are images respectively representing the items X to Z. In the following, when it is not necessary to distinguish among the item objects 36X to 36Z, the item objects 36X to 36Z are simply referred to as an "item object 36".

As used herein, an "item" is something that is used in the game, and that causes a prescribed effect to occur when used in the game. For example, the "item" may enable the user to advantageously proceed in a battle with an enemy. For example, there are items for causing damage to an enemy, items for recovering from damage received by the user, items for decreasing an ability of an enemy (attack strength, defensive strength, etc.), and items for improving an ability of the user (attack strength, defensive strength, etc.). The user can use the item by selecting the item object 36.

An attack icon 38 is also displayed on the game screen 30. The attack icon 38 is an icon for issuing an instruction to attack the enemy. For example, in this embodiment, when attacking the enemy, the user selects a body part to attack. For example, the head, the left arm, or the right arm may be selected as the body part to attack. More specifically, when the user selects the attack icon 38 and then selects any one of the head, the left arm, and the right arm of the enemy as the body part to attack, an attack is executed on the selected body part. For example, on the game screen 30 illustrated in FIG. 2, the enemy is holding a weapon in its left hand and a shield in its right hand. Therefore, for example, the attack strength of the enemy can be decreased by attacking the left arm of the enemy, and the defensive strength of the enemy can be decreased by attacking the right arm of the enemy. Further, for example, when the level of damage to the head of the enemy has reached a prescribed value, the enemy is considered to be vanquished.

A chat icon 40 is also displayed on the game screen 30. The chat icon 40 is an icon for making a statement. More specifically, the chat icon 40 is an icon for inputting a message to another user.

A "message" is information to be conveyed between the terminals operated by the users. Examples of messages may include a symbol string, a moving image, speech, a combination thereof, etc., which are input or specified by the user. The meaning of "symbol string" includes a character string (e.g., including emoticons, ASCII art, plus/minus symbols forming a code only known by the users, etc.), an image, and a combination thereof. The "symbol string" may be only "one" symbol long.

Figure 3:
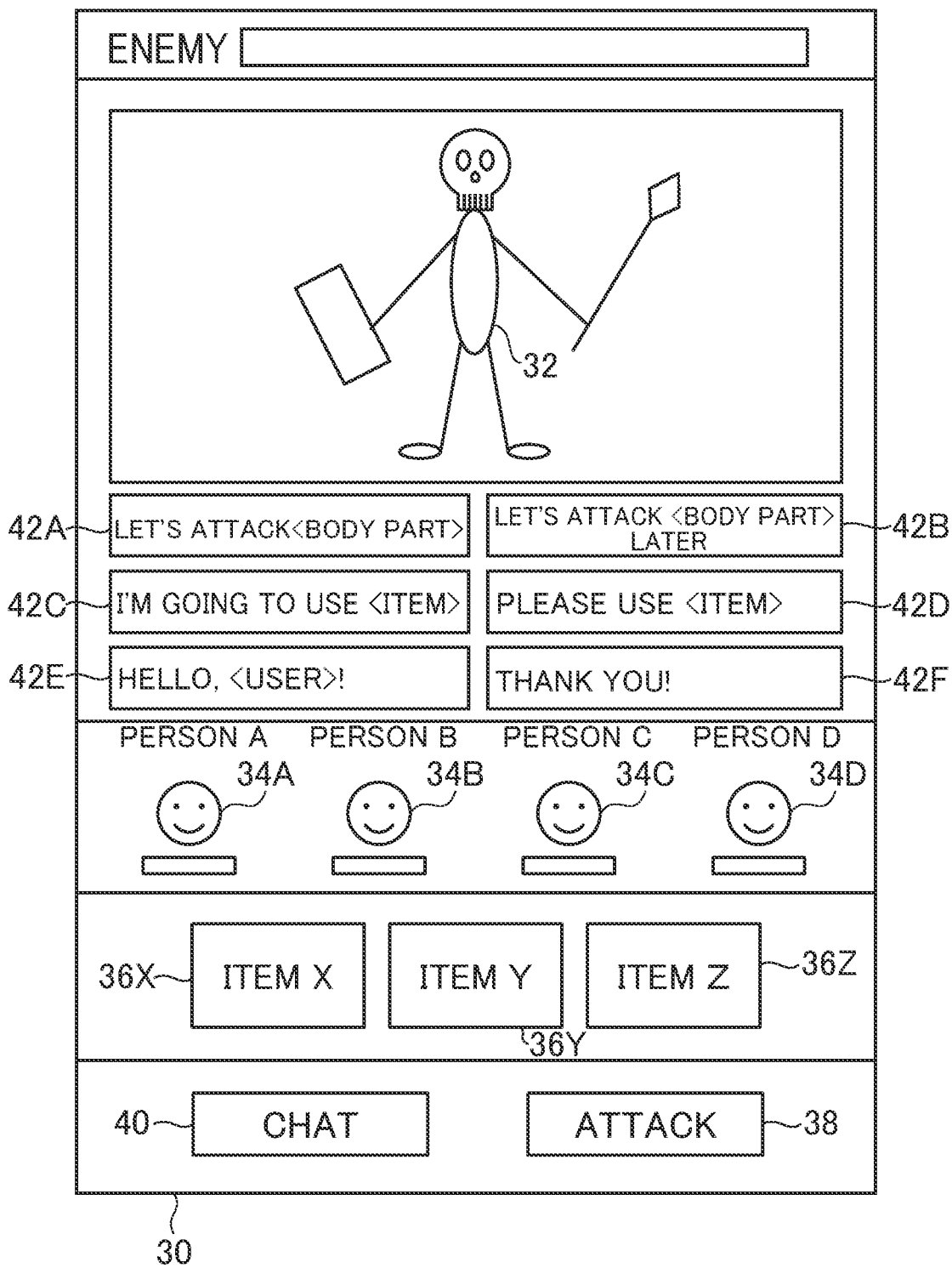
FIG. 3 is a diagram for illustrating an example of the game screen.

When the chat icon 40 has been selected by the user, a message registered in advance (hereinafter referred to as "registered message") is displayed as a candidate of the message to another user. In FIG. 3, an example of the game screen 30 in such a case is illustrated. A plurality of registered message objects 42A, 42B, 42C, 42D, 42E, and 42F respectively representing a plurality of registered messages are displayed on the game screen 30 illustrated in FIG. 3. A message to another user can be input by the user selecting any one of the registered message objects 42A to 42F. In the following, when it is not necessary to distinguish among the registered message objects 42A to 42F, the registered message objects 42A to 42F are simply referred to as a "registered message object 42".

In this embodiment, a message relating to a given target (e.g., body part to attack, item, user, etc.) may be registered in a state in which that target is not specifically identified. For example, a message to another user urging a given action (e.g., attack the enemy, use an item, use a special skill, use magic, etc.), or a message telling another user that a given action is to be performed, may be registered in a state in which the target of that action (e.g., body part to attack, item to be used, special skill to be used, magic to be used, etc.) is not specifically identified. Further, for example, a message representing a greeting, thankfulness, etc., to a given user may be registered in a state in which the given user is not specifically identified.

In this embodiment, for example, messages including tags are registered as the registered messages. In the case of the example illustrated in FIG. 3, for example, the tags <body part>, <item>, and <user> are included in the registered messages.

For example, the <body part> tag is included in the registered message represented by the registered message object 42A. The content of that registered message is a call to another user to attack a given body part. The portion representing the body part to attack is the <body part> tag, and in this example the body part to attack is not specifically specified. As described later, the <body part> tag represents a portion that is to be replaced by the name of any one of the body parts. Because the name of any one of the body parts is inserted into the position represented by the <body part> tag, the <body part> tag may be said to represent the position that the name of any one of the body parts is to be inserted into.

Further, for example, the <item> tag is included in the registered message represented by the registered message object 42C. The content of that registered message is to tell another user that a given item is to be used. The portion representing the item to be used is the <item> tag, and in this example the item to be used is not specifically specified. As described later, the <item> tag represents a portion that is to be replaced by the name of any one of the items. Because the name of any one of the items is inserted into the position represented by the <item> tag, the <item> tag may be said to represent the position that the name of any one of the items is to be inserted into.

Further, for example, the <user> tag is included in the registered message represented by the registered message object 42E. The registered message is a message (greeting) to a given user. The portion representing the given user is the <user> tag, and in this example the given user is not specifically specified. As described later, the <user> tag represents a portion that is to be replaced by the name of any one of the users. Because the name of any one of the users is inserted into the position represented by the <user> tag, the <user> tag may be said to represent the position that the name of any one of the users is to be inserted into.

Examples of the tags are not limited to the examples described above. For example, a tag representing a special skill or magic may be included in the registered messages. A message not including a tag such as those described above may also be registered as a registered message (refer to registered message object 42F).

Figure 4:
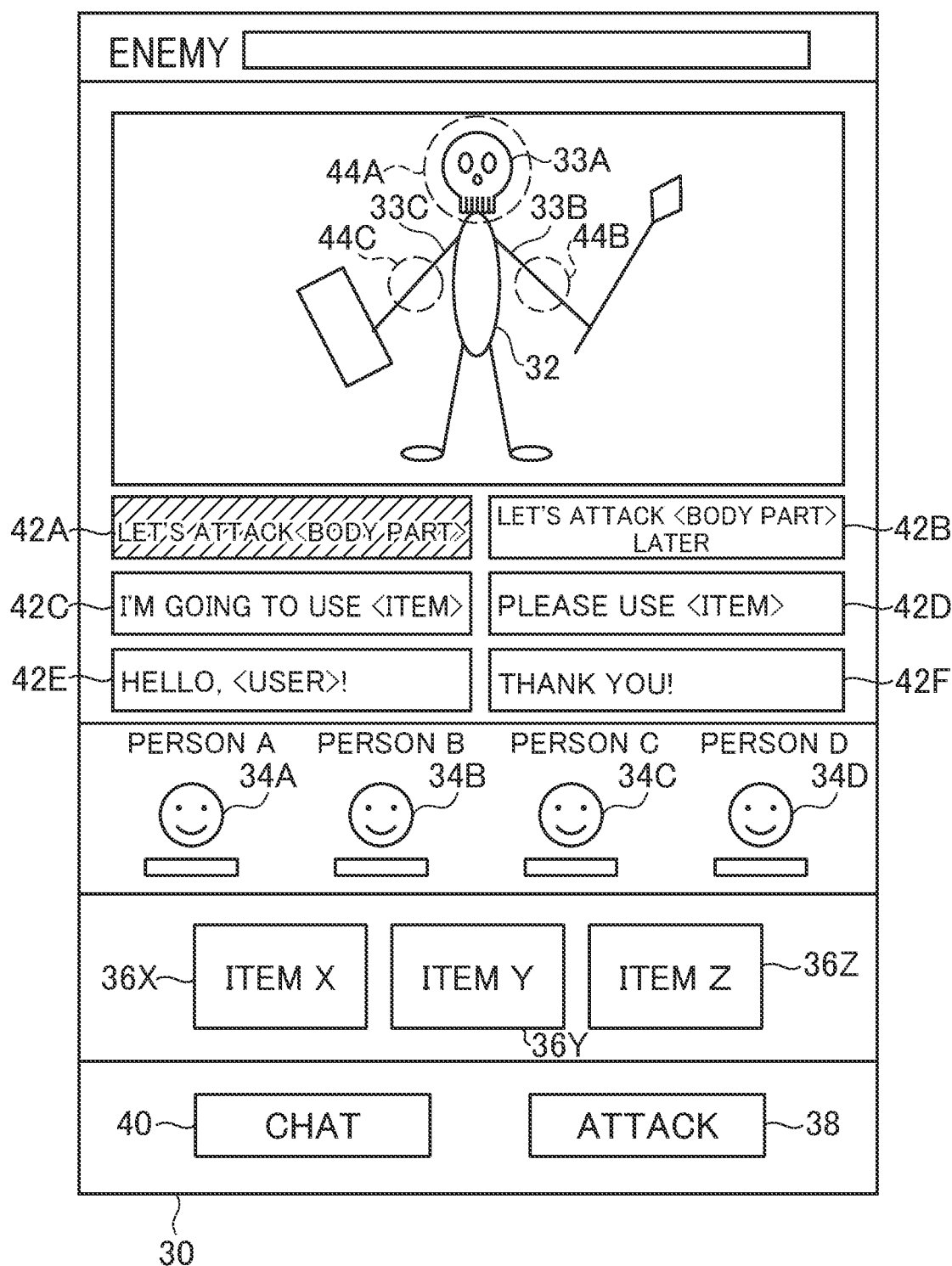
FIG. 4 is a diagram for illustrating an example of the game screen.

FIG. 4 is a diagram for illustrating an example of the game screen 30 when the registered message object 42 representing a registered message including a tag has been selected by the user. In FIG. 4, an example of the game screen 30 when the registered message object 42A has been selected is illustrated. As described above, the registered message represented by the registered message object 42A includes the <body part> tag, but the body part to attack is not specifically specified. As a result, in this case, the user is requested to select the body part to attack.

On the game screen 30 in this case, markers representing the body parts capable of being selected by the user as attack targets are displayed. In FIG. 4, a case is illustrated in which any one of the head, the left arm, and the right arm of the enemy can be selected as the attack target. Therefore, on the game screen 30 illustrated in FIG. 4, markers 44A, 44B, and 44C are displayed in association with, respectively, a body part object 33A representing the head, a body part object 33B representing the left arm, and a body part object 33C representing the right arm. The body part objects 33A to 33C are images respectively representing the head, the left arm, and the right arm of the enemy. In the following, when it is not necessary to distinguish among the body part objects 33A to 33C, the body part objects 33A to 33C are simply referred to as a "body part object 33", and when it is not necessary to distinguish among the markers 44A to 44C, the markers 44A to 44C are simply referred to as a "marker 44".

Because the registered message represented by the registered message object 42B also includes the <body part> tag, the markers 44A to 44C illustrated in FIG. 4 are also displayed when the registered message object 42B is selected.

The registered messages represented by the registered message objects 42C and 42D include the <item> tag, but no item has been specifically selected. Therefore, when the registered message object 42C or 42D is selected, the user is requested to select an item. More specifically, the markers 44 are respectively displayed in association with the item objects 36X to 36Z.

The registered message represented by the registered message object 42E includes the <user> tag, but no user has been specifically selected. Therefore, when the registered message object 42E is selected, the user is requested to select a user. More specifically, the markers 44 are respectively displayed in association with the user objects 34A to 34D.

Figure 5:
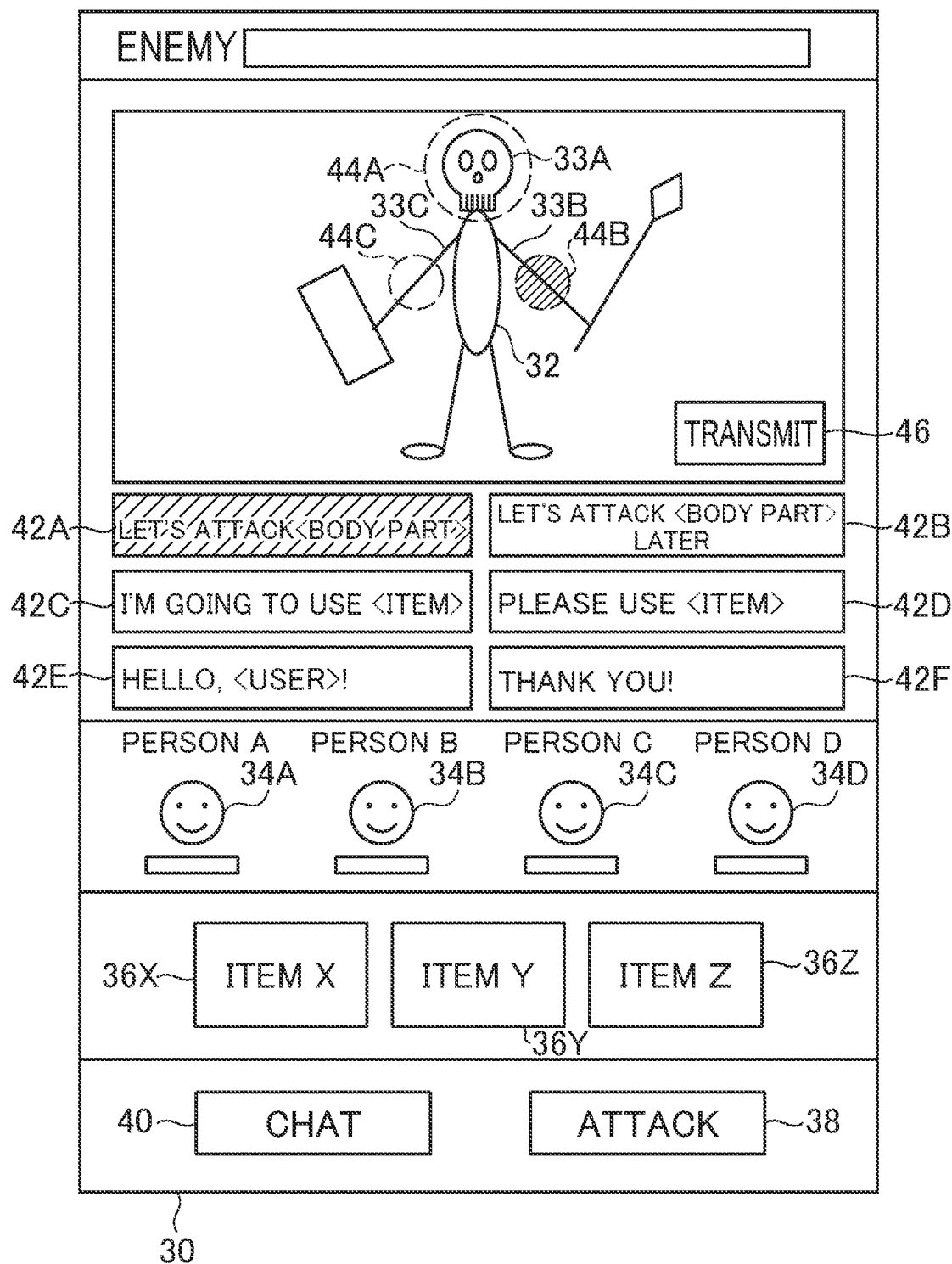
FIG. 5 is a diagram for illustrating an example of the game screen.

On the game screen 30 illustrated in FIG. 4, the user selects any one of the body part objects 33 by selecting any one of the markers 44A to 44C. FIG. 5 is a diagram for illustrating an example of the game screen 30 when any one of the markers 44A to 44C has been selected. In FIG. 5, an example of the game screen 30 when the marker 44B has been selected (i.e., when the body part object 33B representing the left arm has been selected) is illustrated.

As illustrated in FIG. 5, a transmit icon 46 is displayed on the game screen 30 in this case. When the transmit icon 46 is selected by the user, a message obtained by replacing the <body part> tag included in the registered message represented by the registered message object 42A with the name (left arm) of the body part object 38B is determined as having been input by the user. Specifically, the message "attack the left arm" is determined as having been input by the user. When the marker 44B has been selected, the message "attack the left arm" may be determined as having been input by the user without displaying the transmit icon 46.

Figure 6:
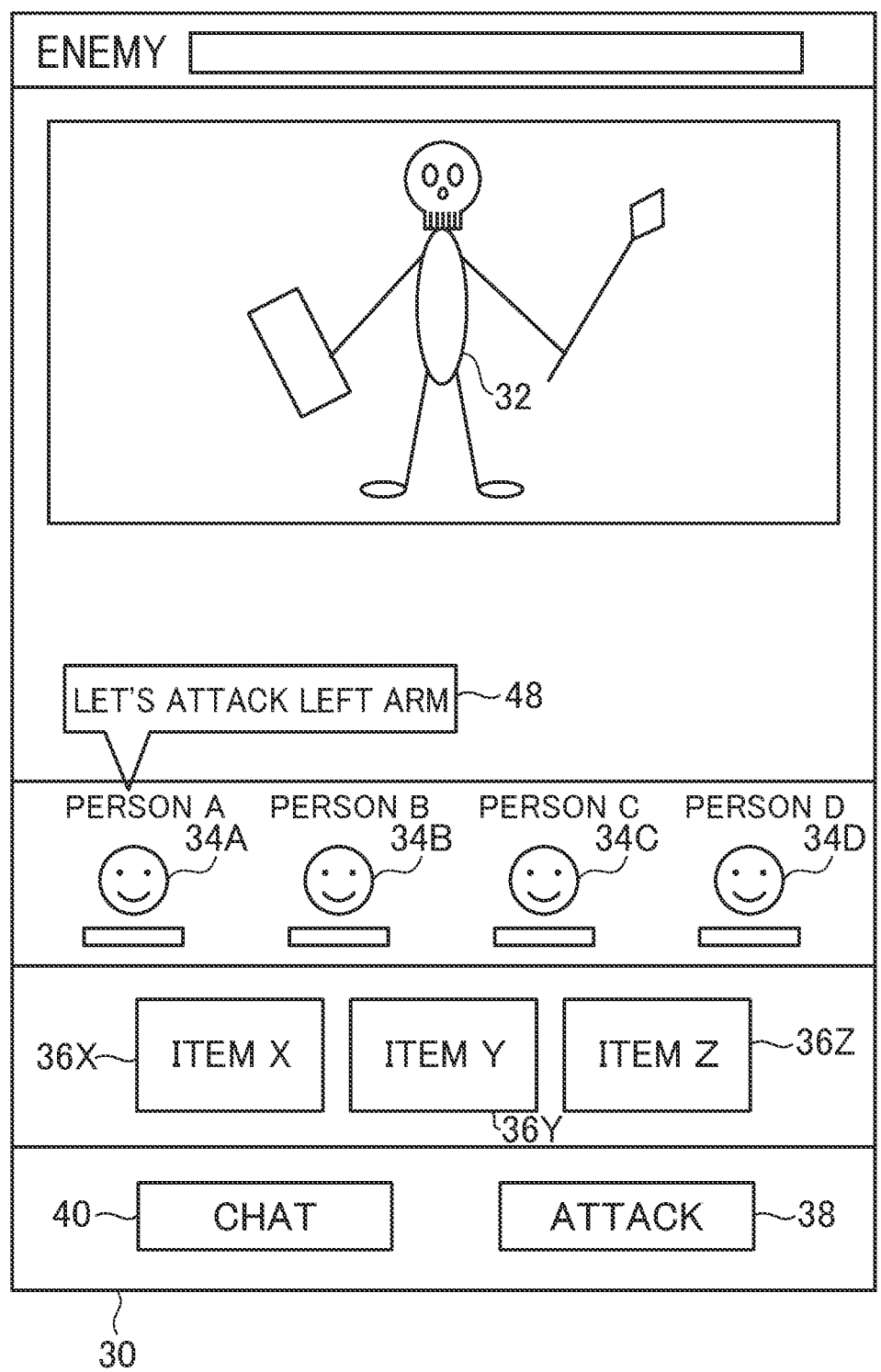
FIG. 6 is a diagram for illustrating an example of the game screen.

When it is determined that the message "attack the left arm" has been input by the user, as illustrated in FIG. 6, a message object 48 representing that message is displayed on the game screen 30. The message object 48 is displayed on each terminal 20 of the users A, B, C, and D.

The message object 48 is displayed in association with the user object 34A representing the user A who input the message. For example, in the example illustrated in FIG. 6, the message object 48 is a speech balloon image including the message in a speech balloon. The message object 48 is displayed such that the speech balloon extends from the user object 34A representing the user A. As a result, the fact that the message is input by the user A can be identified.

It is not necessary for the message object 48 to be represented in two dimensions as illustrated in FIG. 6. The message object 48 may be represented in three dimensions in a virtual space.

Thus, with the message system 1, the user can input a message having content matching the current situation. For example, in a situation in which the left arm of the enemy needs to be attacked, the user can input a message calling for other users to attack the left arm of the enemy.

Further, with the message system 1, the user can input a message matching the current situation such as that described above by selecting the registered message and the object. For example, the user can input a message calling for other users to attack the left arm of the enemy by selecting the registered message object 42A and the body part object 33B (marker 44B). In other words, the user can input messages like those described above without typing the messages every occasion.

More specifically, according to the message system 1, the time taken to input a message can be shortened while ensuring flexibility relating to the content of the message.

The registered messages described above are set for each user. More specifically, with the message system 1, registered messages like those described above may be freely set by the user. A sequence performed by the user for setting the registered messages is now described.

Figure 7:
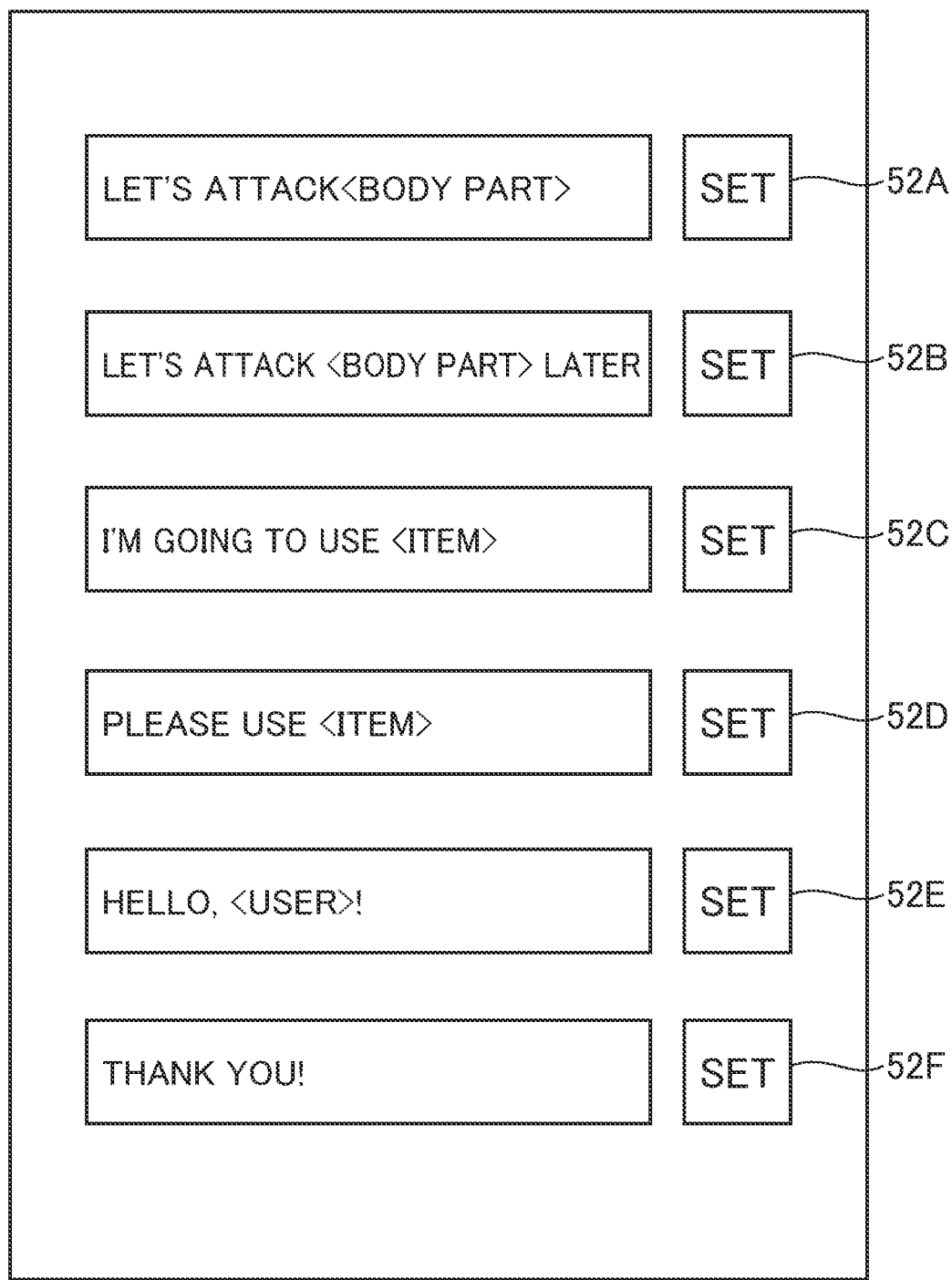
FIG. 7 is a diagram for illustrating an example of a list screen.

FIG. 7 is a diagram for illustrating an example of a list screen showing a list of the registered messages. A list screen 50 illustrated in FIG. 7 is displayed on the display unit 25 of the terminal 20 when the user has performed a prescribed operation, for example. As illustrated in FIG. 7, a list of the registered messages is displayed on the list screen 50. Setting icons 52A, 52B, 52C, 52D, 52E, and 52F are also displayed in association with each registered message. The user selects any one of the registered messages displayed on the list screen 50 by selecting any one of the setting icons 52A to 52F. In the following, when it is not necessary to distinguish among the setting icons 52A to 52F, the setting icons 52A to 52F are simply referred to as a "setting icon 52".

Figure 8:
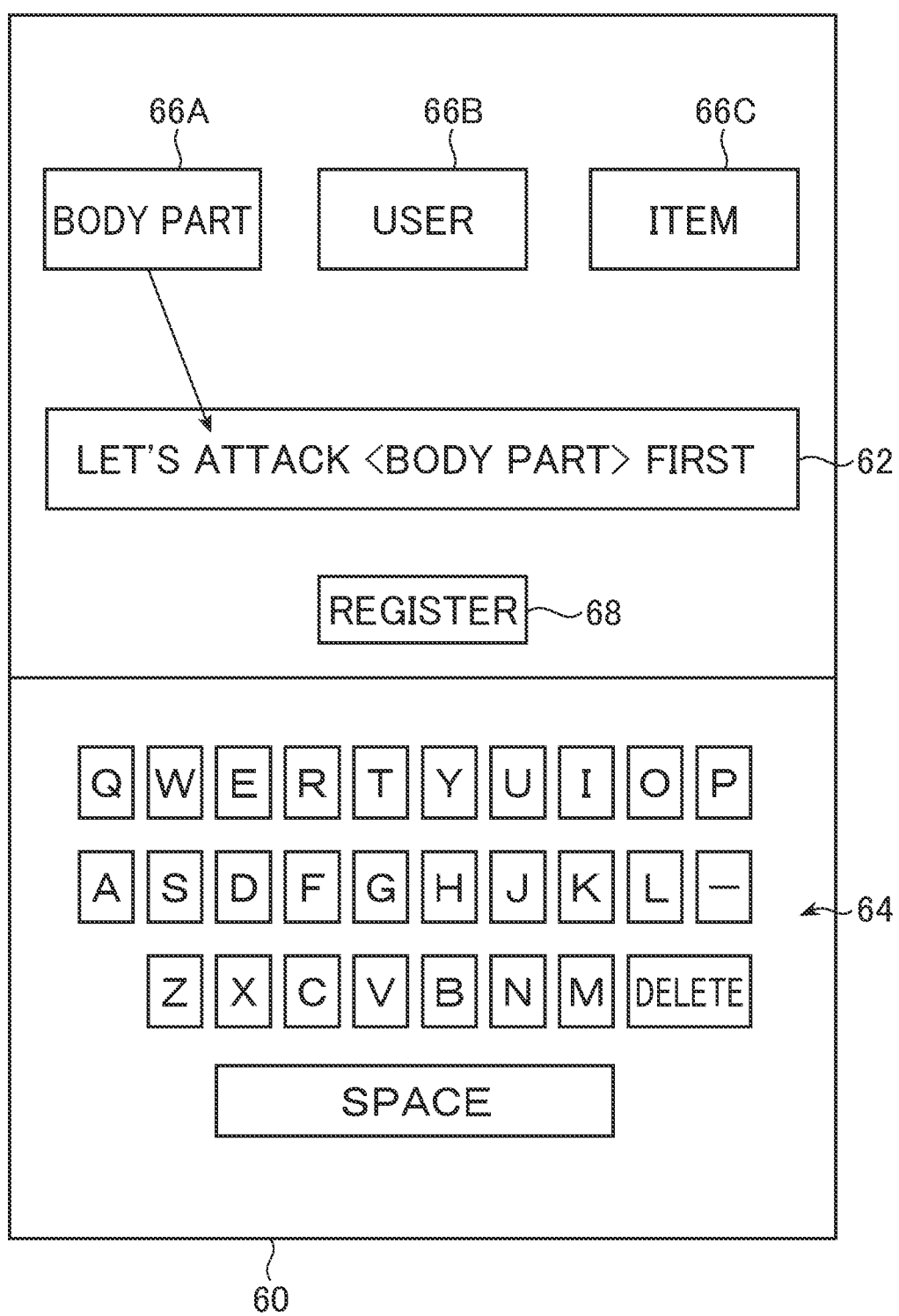
FIG. 8 is a diagram for illustrating an example of a registration screen.

When any one of the registered messages displayed on the list screen 50 has been selected, a registration screen for registering the registered message is displayed. In FIG. 8, an example of a registration screen is illustrated. A field 62 is displayed on a registration screen 60 illustrated in FIG. 8. The field 62 is a field that allows the user to input a message.

A virtual keyboard 64 is also displayed on the registration screen 60 illustrated in FIG. 8. The virtual keyboard 64 is a virtual keyboard (software keyboard) for inputting symbols (e.g., characters) in the field 62. The user interface for inputting the symbols is not limited to the virtual keyboard 64. Various types of user interface may be employed as the user interface for inputting the symbols.

Tag icons 66A, 66B, and 66C are also displayed on the registration screen 60 illustrated in FIG. 8. The tag icon 66A is, for example, an icon corresponding to the <body part> tag. The tag icon 66A is used for including the <body part> tag in the message. The user can set the <body part> tag in the message by dragging and dropping the tag icon 66A into the field 62. More specifically, the <body part> tag is set as a part of the message when the user touches his or her finger on the touch panel so as to touch the tag icon 66A, moves his or her finger to the field 62 while still touching the touch panel, and releases his or her finger from the touch panel.

The tag icon 66B is, for example, an icon corresponding to the <user> tag. The tag icon 66B is used for including the <user> tag in the message. The tag icon 66C is, for example, an icon corresponding to the <item> tag. The tag icon 66C is used for including the <item> tag in the message.

The user interface for inputting the tags is not limited to the example described above. Various types of user interfaces may be employed as the user interface for inputting the tags. For example, the user may input the tags by using the virtual keyboard 64.

A register icon 68 is displayed on the registration screen 60 illustrated in FIG. 8. When the register icon 68 is selected, the message input in the field 62 is registered. In other words, the message input in the field 62 is set as a registered message.

The user can newly set registered messages and change the registered messages in the manner described above.

Figure 9:
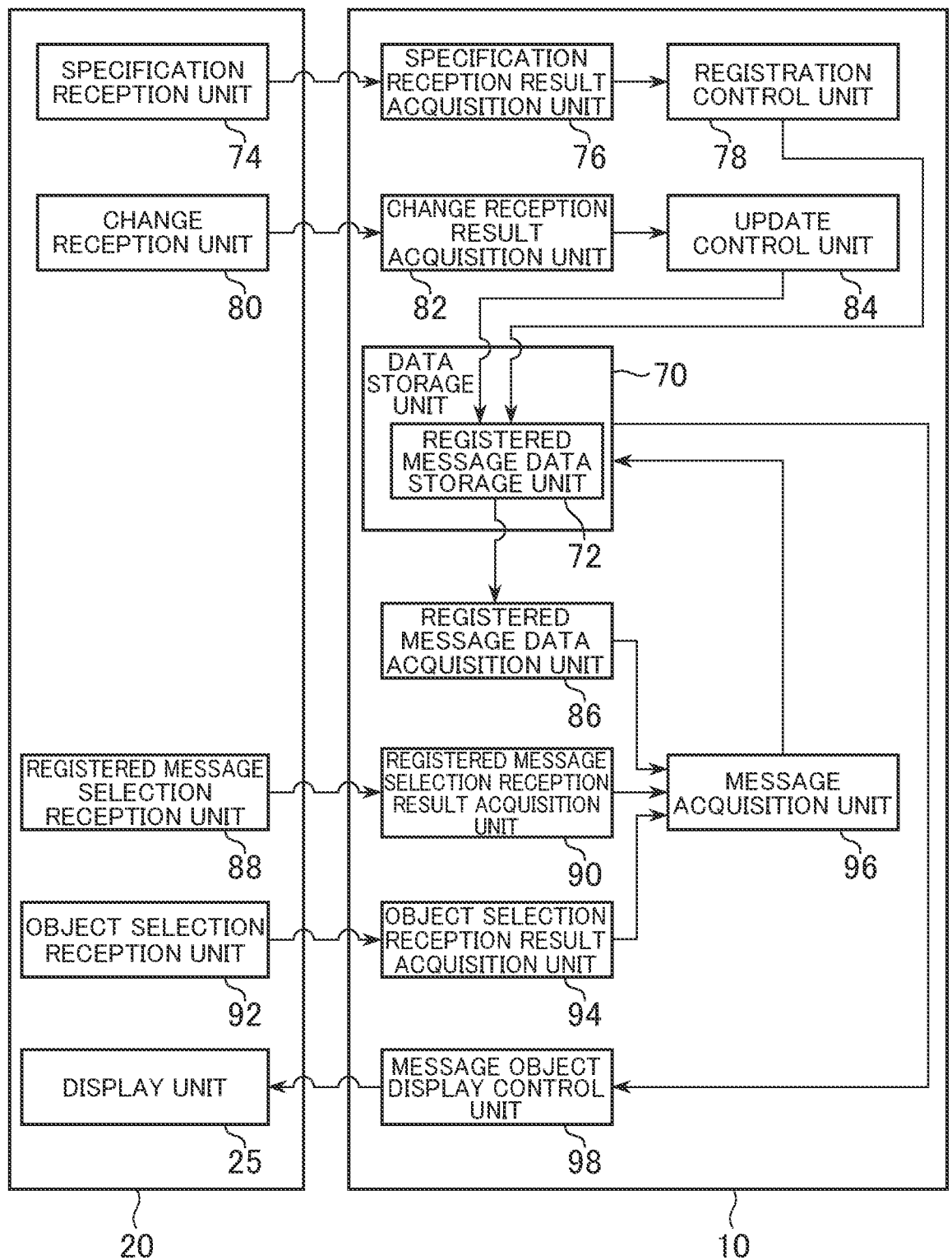
FIG. 9 is a function block diagram of the message system.

Next, a configuration for implementing functions such as those described above is described. FIG. 9 is a function block diagram for illustrating function blocks implemented by the message system 1.

As illustrated in FIG. 9, the message system 1 includes a data storage unit 70. The data storage unit 70 is implemented by, for example, the storage unit 12 of the server 10. The data storage unit 70 may also be implemented by a storage unit included in another device accessible from the server 10.

The data storage unit 70 is configured to store various types of data. The data storage unit 70 includes a registered message data storage unit 72. The registered message data storage unit 72 is configured to store registered message data.

The registered message data is data required in order to output (e.g., display) the registered messages registered in advance. For example, data required in order to output each of a plurality of registered messages registered in advance is included as the registered message data. Further, for example, at least one object-related registered message is included in the plurality of registered messages.

The expression "object-related registered message" refers to a registered message having content related to an object.

Specifically, the object-related registered message is a registered message set so that a symbol string relating to at least one object can be inserted into a prescribed position or can replace a prescribed portion. The "object" is the target of selection by the user, and is what is displayed on the screen. The "prescribed position" may be, for example, a position determined for each object-related registered message, or may be a fixed position (e.g., a start position or an end position of the object-related registered message). Similarly, the "prescribed portion" may be, for example, a portion determined for each object-related registered message, or may be a fixed portion (e.g., a start portion or an end portion of the object-related registered message).

For example, in the case of the example illustrated in FIG. 2 to FIG. 8, the body part object 33, the user object 34, or the item object 36 correspond to the "object". Further, for example, a registered message including the <body part> tag, the <item> tag, or the <user> tag corresponds to the "object-related registered message". In other words, the registered messages represented by each of the registered message objects 42A to 42E correspond to the "object-related registered message".

For example, the registered message data includes insertion position information or replacement portion information. The registered message data also includes object type information, for example.

The expression "insertion position information" refers to information representing a position (hereinafter referred to as "insertion position") in the object-related registered message that a symbol string relating to the object can be inserted into. In this case, the position represented by the insertion position information corresponds to the above-mentioned "prescribed position". For example, the "insertion position information" may be tag information embedded in the above-mentioned insertion position in the object-related registered message. Further, for example, the "insertion position information" may be information representing the number of characters the insertion position is from the start (or end) of the object-related registered message. For example, in the case of the example illustrated in FIG. 2 to FIG. 8, the <body part> tag, the <item> tag, or the <user> tag correspond to the "insertion position information".

The expression "replacement portion information" includes replacement portion information representing a portion (hereinafter referred to as "replacement portion") in the object-related registered message that can be replaced by a symbol string relating to the object. In this case, the portion represented by the replacement portion information corresponds to the above-mentioned "prescribed portion". For example, the "replacement portion information" may be tag information embedded in the above-mentioned replacement portion in the object-related registered message. Further, for example, the "replaceable portion information" may be information representing whether or not the replacement portion is a portion from a given number of characters until a given number of characters from the start (or end) of the object-related registered message. For example, in the case of the example illustrated in FIG. 2 to FIG. 8, the <body part> tag, the <item> tag, or the <user> tag correspond to the "replacement portion information".

The expression "object type information" refers to information capable of identifying the object type corresponding to the object-related registered message. The expression "object type corresponding to the object-related registered message" refers to the object type matching the content of the object-related registered message. In other words, the "object type corresponding to the object-related registered message" may be the object type related to the content of the object-related registered message, the object type predicted based on the content of the object-related registered message, or the object type mentioned in the content of the object-related registered message.

For example, in the case of the example illustrated in FIG. 2 to FIG. 8, the object type corresponding to the registered messages represented by the registered message objects 42A and 42B is "body part", the object type corresponding to the registered messages represented by the registered message objects 42C and 42D is "item", and the object type corresponding to the registered message represented by the registered message object 42E is "user". In the case of the example illustrated in FIG. 2 to FIG. 8, the <body part> tag, the <item> tag, and the <user> tag correspond to the "object type information".

In FIG. 10 to FIG. 12, an example of the data stored in the data storage unit 70 (registered message data storage unit 72) is shown.

In FIG. 10, a registered message table is shown. The registered message table is a set of data showing a list of the registered messages of each user. The registered message table includes a "registered message identification (ID)" field, a "registered by" field, and a "registered message" field.

The "registered message ID" field indicates information for uniquely identifying each registered message. The "registered by" field indicates the user who registered each registered message. The user ID of the user who registered each registered message is registered in the "registered by" field. The "registered message" field indicates the content of each registered message.

In FIG. 11, an object table is shown. The object table is a set of data showing a list of the objects in the game that are selectable by the user. In other words, the object table is a set of data showing a list of the objects that can be displayed on the screen. The object table includes an "object ID" field, an "object type" field, and an "object name" field.

The "object ID" field indicates information for uniquely identifying each object. The "object type" field indicates the type of each object. The "object name" field indicates the name of each object.

In FIG. 12, a message table is shown. The message table is a set of data showing a list of the messages input by each user. The message table includes a "message ID" field, an "input by" field, an "input date and time field", a "message" field, and a "related object" field.

The "message ID" field indicates information for uniquely identifying the messages input by each user. The "input by" field indicates the user who input each message. The user ID of the user who input each message is registered in the "input by" field. The "input date and time" field indicates the date and time at which each message was input. The "message" field indicates the content of each message.

The "related object" field indicates the object related to each message. For example, when the message is a message generated by replacing the prescribed portion of the object-related registered message with the symbol string relating to the object (or, a message generated by inserting the symbol string relating to the object into the prescribed position of the object-related registered message), information (object ID) representing that object is registered in the "related object" field.

As illustrated in FIG. 9, the message system 1 includes a specification reception unit 74, a specification reception result acquisition unit 76, a registration control unit 78, a change reception unit 80, a change reception result acquisition unit 82, and an update control unit 84. Those function blocks are function blocks relating to the setting (newly registering or updating) of registered messages. The specification reception unit 74 and the change reception unit 80 are implemented by, for example, the control unit 21 and the storage unit 22 of the terminal 20. More specifically, for example, the specification reception unit 74 and the change reception unit 80 are implemented by the control unit 21 executing programs stored in the storage unit 22. The specification reception result acquisition unit 76, the registration control unit 78, the change reception result acquisition unit 82, and the update control unit 84 are implemented by, for example, the control unit 11 and the storage unit 12 of the server 10 (message input reception device). More specifically, for example, the specification reception result acquisition unit 76, the registration control unit 78, the change reception result acquisition unit 82, and the update control unit 84 are implemented by the control unit 11 executing programs stored in the storage unit 12.

The specification reception unit 74 is configured to receive a specification of the object-related registered message and a specification of the above-mentioned insertion position or the above-mentioned replacement portion from the user via the operation unit 24. The specification reception result acquisition unit 76 is configured to acquire a reception result of the specification reception unit 74. For example, the reception result of the specification reception unit 74 is transmitted to the server 10 via the communication unit 23, and received by the server 10 via the communication unit 13. The specification reception result acquisition unit 76 is configured to acquire the reception result received via the communication unit 13. The registration control unit 78 is configured to perform control for registering in the registered message data storage unit 72 registered message data showing the object-related registered message specified by the user and including the insertion position information representing the insertion position specified by the user or the replacement portion information representing the replacement portion specified by the user.

The change reception unit 80 is configured to receive a change to the object-related registered message and a change to the insertion position information or the replacement portion information from the user via the operation unit 24. The change reception result acquisition unit 82 is configured to acquire a reception result of the change reception unit 80. For example, the reception result of the change reception unit 80 is transmitted to the server 10 via the communication unit 23, and received by the server 10 via the communication unit 13. The change reception result acquisition unit 82 is configured to acquire the reception result received via the communication unit 13. The update control unit 84 is configured to perform control for updating, based on the reception result of the change reception unit 80, the registered message data stored in the registered message data storage unit 72.

For example, in the example illustrated in FIG. 2 to FIG. 8, the specification reception unit 74 is configured to receive the specification of the object-related registered message and the specification of the insertion position or the replacement portion from the user via the operation unit 24 (touch panel) by displaying the registration screen 60 on the display unit 25. The specification reception unit 74 is configured to acquire, when the register icon 68 on the registration screen 60 has been selected, the message input in the field 62 on the registration screen 60, and to transmit data representing that message as the reception result to the server 10 via the communication unit 23. The specification reception result acquisition unit 76 is configured to acquire via the communication unit 13 the data transmitted by the terminal 20 (specification reception unit 74). The registration control unit 78 is configured to register the message represented by the acquired data in the registered message data. The operations of the change reception unit 80, the change reception result acquisition unit 82, and the update control unit 84 are basically the same as the operations of the specification reception unit 74, the specification reception result acquisition unit 76, and the registration control unit 78.

As illustrated in FIG. 9, the message system 1 includes a registered message data acquisition unit 86, a registered message selection reception unit 88, a registered message selection reception result acquisition unit 90, an object selection reception unit 92, an object selection reception result acquisition unit 94, and a message acquisition unit 96. Those function blocks are function blocks relating to reception of input of a message. The registered message selection reception unit 88 and the object selection reception unit 92 are implemented by, for example, the control unit 21 and the storage unit 22 of the terminal 20. More specifically, for example, the registered message selection reception unit 88 and the object selection reception unit 92 are implemented by the control unit 21 executing programs stored in the storage unit 22. The registered message data acquisition unit 86, the registered message selection reception result acquisition unit 90, the object selection reception result acquisition unit 94, and the message acquisition unit 96 are implemented by, for example, the control unit 11 and the storage unit 12 of the server 10 (message input reception device). More specifically, for example, the registered message data acquisition unit 86, the registered message selection reception result acquisition unit 90, the object selection reception result acquisition unit 94, and the message acquisition unit 96 are implemented by the control unit 11 executing programs stored in the storage unit 12.

The registered message selection reception unit 88 is configured to receive from the user via the operation unit 24 a selection of any one of a plurality of registered messages. The registered message selection reception result acquisition unit 90 is configured to acquire a reception result of the registered message selection reception unit 88. For example, the reception result of the registered message selection reception unit 88 is transmitted to the server 10 via the communication unit 23, and received by the server 10 via the communication unit 13. The registered message selection reception result acquisition unit 90 is configured to acquire the received reception result.

For example, in the case of the example illustrated in FIG. 2 to FIG. 8, the registered message selection reception unit 88 is configured to receive from the user via the operation unit 24 (touch panel) a selection of anyone of a plurality of registered messages by displaying on the game screen 30 a plurality of registered message objects 42 respectively representing the plurality of registered messages. The registered message selection reception unit 88 is configured to transmit data representing the registered message selected by the user as the reception result to the server 10 via the communication unit 23. The registered message selection reception result acquisition unit 90 is configured to acquire via the communication unit 13 the data transmitted by the terminal 20 (registered message selection reception unit 88).

The object selection reception unit 92 is configured to receive from the user via the operation unit 24 a selection of an object displayed on the screen. The object selection reception unit 92 may also be configured to restrict reception of a selection of an object other than the type corresponding to the object-related registered message selected by the user.

As described above, the expression "type corresponding to the object-related registered message" refers to, for example, the object type matching the content of the object-related registered message.

The expression "restrict reception of a selection of an object" refers to, for example, setting to a state in which the object is not selectable. For example, the expression "restrict reception of a selection of an object" may refer to setting such that the object is not selectable because the object is not displayed on the screen. Further, the expression "restrict reception of a selection of an object" may also refer to, for example, denying reception of a selection on the device (computer) side even when the object has been selected by the user, or invalidating the selection per se. For example, the expression "restrict reception of a selection of an object" may refer to displaying a warning stating that, when an object has been selected by the user, that object is not selectable.

The object selection reception unit 92 may also be configured to display the object of the type corresponding to the object-related registered message selected by the user among the objects displayed on the screen and the other objects among the objects displayed on the screen in a manner that is distinguishable by the user.

As used herein, "display a first object and a second object in a manner that is distinguishable by the user" refers to, for example, displaying the objects so that the first object and the second object can be distinguished by the user. The expression "display a first object and a second object in a manner that is distinguishable by the user" may include, for example, the following.

(a) A prescribed image (e.g., marker, frame, etc.) is displayed in association with only one of the first object and the second object, and the prescribed image is not displayed in association with another of the first object and the second object.

(b) A display mode (color, brightness, size, shape, type, line type, etc.) of a prescribed image (e.g., marker, frame, etc.) to be displayed in association with the first object is changed to be different from the display mode of the prescribed image to be displayed in association with the second object.

(c) The display mode (color, brightness, etc.) of the first object itself is changed to be different from the display mode of the second object itself.

(d) The first object is displayed in a first prescribed area, and the second object is displayed in a second prescribed area different from the first prescribed area.

(e) When the first object and the second object are to be displayed based on a display order, the display order of the first object is set higher than the display order of the second object.

For example, in the case of the example illustrated in FIG. 2 to FIG. 8, the object selection reception unit 92 is configured to receive via the operation unit 24 (touch panel) a selection of any one of a plurality of objects displayed on the game screen 30 by displaying the marker 44 in association with each of the plurality of objects.

For example, when the registered message object 42A or 42B has been selected by the user, the <body part> tag is included in the registered messages represented by the registered message objects 42A and 42B, and those registered messages are messages having content relating to a body part of the enemy.

In this case, the object selection reception unit 92 is configured to display the marker 44 in association with only the body part object 33 for which the type is set to "body part", and to not display the markers 44 in association with the other object types (i.e., the user object 34 and the item object 36).

In such a configuration, the object selection reception unit 92 is configured to display the object (body part object 33) of the type corresponding to the registered message selected by the user and the other objects (user object 34 and item object 36) in a manner that is distinguishable by the user.

Further, in such a configuration, the object selection reception unit 92 is configured to set only the object (body part object 33) of the type corresponding to the registered message selected by the user to a selectable state, and set the other objects (user object 34 and item object 36) to a non-selectable state.

When the registered message object 42C or 42D has been selected by the user, because the <item> tag is included in the registered messages represented by the registered message objects 42C and 42D, and because those registered messages are messages having content relating to an item, the object selection reception unit 92 is configured to display the marker 44 in association with only the item object 36 for which the type is set to "item".

When the registered message object 42E has been selected by the user, because the <user> tag is included in the registered message represented by the registered message object 42E, and because this registered message is a message having content relating to a user, the object selection reception unit 92 is configured to display the marker 44 in association with only the user object 34 for which the type is set to "user".

The object selection reception result acquisition unit 94 is configured to acquire a reception result of the object selection reception unit 92. For example, the reception result of the object selection reception unit 92 is transmitted to the server 10 via the communication unit 23, and is received by the server 10 via the communication unit 13. The object selection reception result acquisition unit 94 is configured to acquire the reception result received via the communication unit 13.

For example, in the example illustrated in FIG. 2 to FIG. 8, the object selection reception unit 92 is configured to transmit, when any one of the markers 44 has been selected by the user, data representing the object associated with the marker 44 selected by the user as the reception result to the server 10 via the communication unit 23. The object selection reception result acquisition unit 94 is configured to acquire via the communication unit 13 the data transmitted by the terminal 20 (object selection reception unit 92).

The registered message data acquisition unit 86 is configured to acquire the registered message data stored in the registered message data storage unit 72. The message acquisition unit 96 is configured to acquire the message input by the user based on the reception result of the registered message selection reception unit 88 and the reception result of the object selection reception unit 92.

The message acquisition unit 96 is configured to acquire, as the message input by the user, a message obtained by replacing the prescribed portion of the object-related registered message selected by the user with the symbol string associated with at least one object selected by the user. For example, the message acquisition unit 96 is configured to acquire a message obtained by replacing the portion in the object-related registered message represented by the replacement portion information with the symbol string associated with at least one object selected by the user.

The message acquisition unit 96 is also configured to acquire, as the message input by the user, a message obtained by inserting the symbol string associated with at least one object selected by the user into the prescribed position of the object-related registered message selected by the user. For example, the message acquisition unit 96 is configured to acquire, as the message input by the user, a message obtained by inserting the symbol string associated with at least one object selected by the user into the position in the object-related registered message represented by the insertion position information.

For example, in the case of the example illustrated in FIG. 2 to FIG. 8, the message acquisition unit 96 is configured to acquire, as the message input by the user, a message obtained by replacing the tag included in the object-related registered message selected by the user with the name of at least one object selected by the user.

The message acquisition unit 96 is configured to store the acquired message in the data storage unit 70. For example, the message acquisition unit 96 is configured to register the acquired message in the message table.

As illustrated in FIG. 9, the message system 1 includes a message object display control unit 98. The message object display, control unit 98 is implemented by, for example, the control unit 11 of the server 10 (message input reception device).

The message object display control unit 98 is configured to perform control for displaying on the screen a message object representing the message acquired by the message acquisition unit 96.

For example, in the case of the example illustrated in FIG. 2 to FIG. 8, the message object display control unit 98 is configured to transmit to the terminal 20 the data required for displaying on the game screen 30 the message object 48 representing the message acquired by the message acquisition unit 96. At the terminal 20, the message object 48 is displayed on the game screen 30 (display unit 25) based on the data transmitted by the server 10 (message object display control unit 98).

Next, processing executed by the message system 1 is described.

Figure 13:
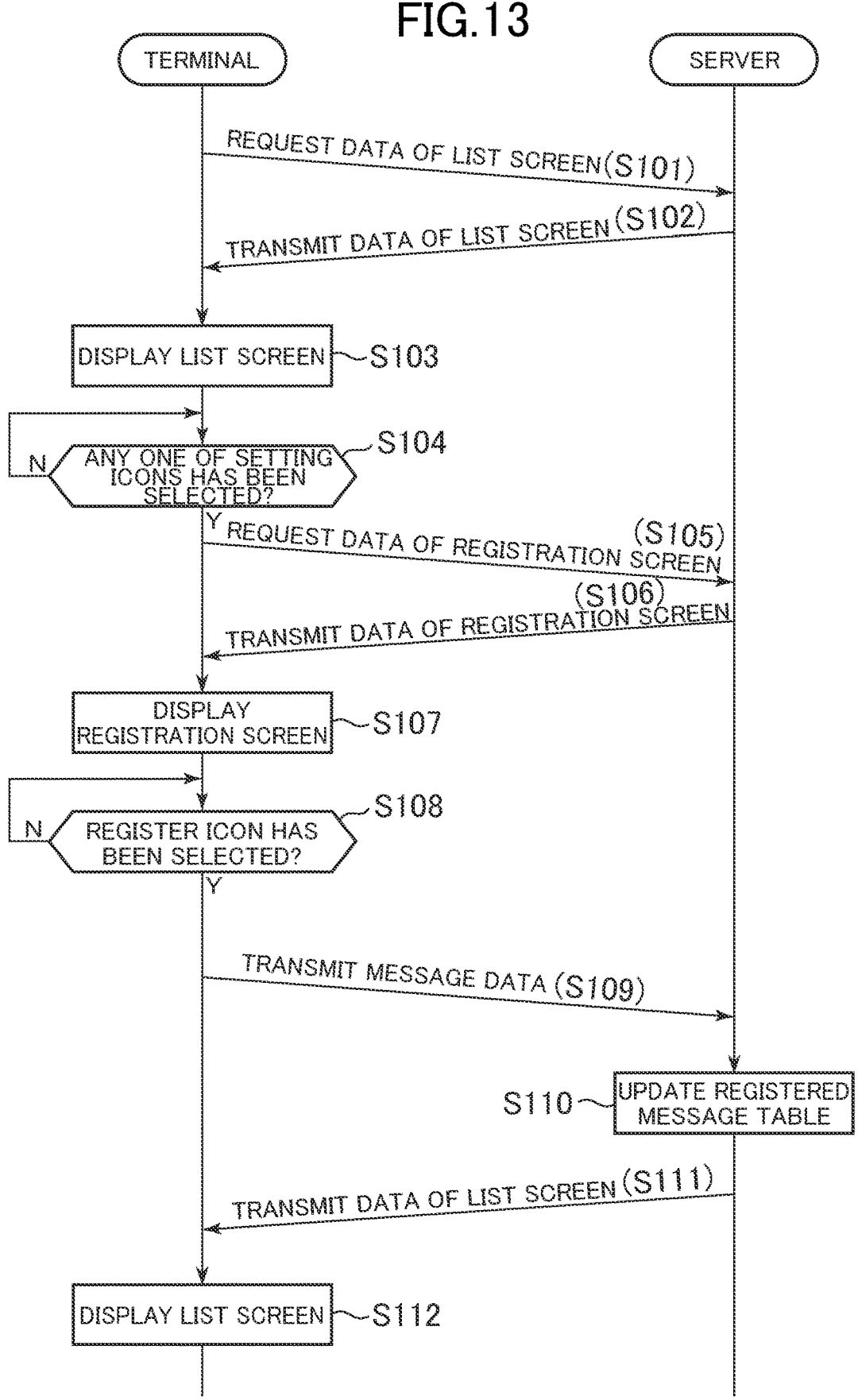
FIG. 13 is a diagram for illustrating an example of processing executed by the message system.

FIG. 13 is a diagram for illustrating an example of processing executed when the user sets a registered message. The control unit 11 is configured to function as the specification reception result acquisition unit 76, the registration control unit 78, the change reception result acquisition unit 82, and the update control unit 84 by executing the processing illustrated in FIG. 13 based on a program. The control unit 21 is configured to function as the specification reception unit 74 and the change reception unit 80 by executing the processing illustrated in FIG. 13 based on a program.

As illustrated in FIG. 13, in this case, the control unit 21 of the terminal 20 issues a request to the server 10 for data of the list screen 50 (S101). The data of the list screen 50" is data for displaying the list screen 50. In Step S101, for example, the user ID input by the user who is using the terminal 20 is transmitted to the server 10.

When the request is received by the server 10, the control unit 11 of the server 10 refers to the registered message table, and acquires a list of the registered messages associated with the user ID received from the terminal 20. Then, the control unit 11 transmits the data of the list screen 50 showing the acquired list to the terminal 20 (S102).

When the data is received by the terminal 20, the control unit 21 of the terminal 20 causes the display unit 25 to display the list screen 50 (S103). During the period in which the list screen 50 is displayed, the control unit 21 monitors whether or not any one of the setting icons 52 has been selected (S104).

When any one of the setting icons 52 has been selected, the control unit 21 issues a request to the server 10 for data of the registration screen 60 (S105). The "data of the registration screen 60" is data for displaying the registration screen 60. In Step S105, the registered message ID of the registered message selected by the user is transmitted to the server 10 together with the user ID of the user.

When the request is received by the server 10, the control unit 11 of the server 10 transmits the data of the registration screen 60 to the terminal 20 (S106). When the data is received by the terminal 20, the control unit 21 of the terminal 20 causes the display unit 25 to display the registration screen 60 (S107).

During the period in which the registration screen 60 is displayed, the control unit 21 updates the message displayed in the field 62 based on a user operation. Specifically, the control unit 21 updates the message displayed in the field 62 based on operations on the virtual keyboard 64 and the tag icons 66. Further, the control unit 21 monitors whether or not the register icon 68 has been selected (S108).

When the register icon 68 has been selected, the control unit 21 transmits the message data to the server 10 (S109). In this case, the "message data" is data representing the message input in the field 62. In Step S109, the message data is transmitted to the server 10 together with the user ID of the user and the registered message ID of the registered message selected on the list screen 50.

When the message data is received by the server 10, the control unit 11 of the server 10 updates the registered message table (S110). For example, the registered message selected on the list screen 50 is updated to the message input in the field on the registration screen 60. More specifically, the registered message associated with the registered message ID received from the terminal 20 is updated to the message input in the field 62 on the registration screen 60.

Then, the control unit 11 refers to the registered message table, and acquires a list of the registered messages associated with the user ID received from the terminal 20. The control unit 11 then transmits the data of the list screen 50 showing the acquired list to the terminal 20 (S111). In this case, based on the transmitted data, the control unit 21 of the terminal 20 causes the display unit 25 to display the list screen 50 (S112). The updated registered message is displayed on the list screen 50.

Figure 14:
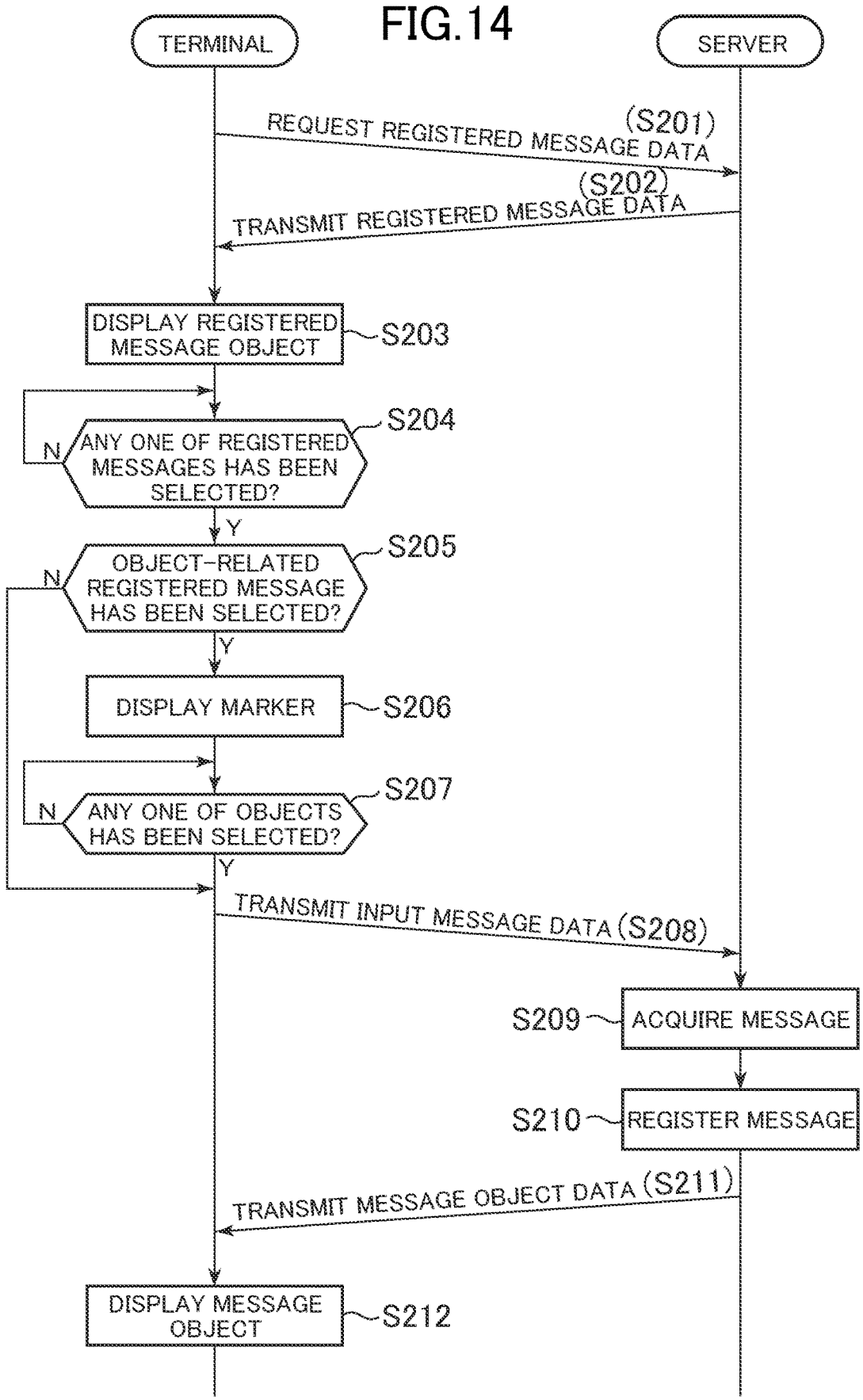
FIG. 14 is a diagram for illustrating an example of other processing executed by the message system.

FIG. 14 is a diagram for illustrating an example of processing executed when the chat icon 40 of the game screen 30 has been selected. The control unit 11 is configured to function as the registered message data acquisition unit 86, the registered message selection reception result acquisition unit 90, the object selection reception result acquisition unit 94, the message acquisition unit 96, and the message object display control unit 98 by executing the processing illustrated in FIG. 14 based on a program. The control unit 21 is configured to function as the registered message selection reception unit 88 and the object selection reception unit 92 by executing the processing illustrated in FIG. 14 based on a program.

As illustrated in FIG. 14, the control unit 21 of the terminal 20 issues a request to the server 10 for the registered message data (S201). In Step S201, for example, the user ID input by the user who is using the terminal 20 is transmitted to the server 10.

When the request is received by the server 10, the control unit 11 of the server 10 refers to the registered message table, and acquires the registered messages associated with the user ID received from the terminal 20. Then, the control unit 11 transmits the data showing the acquired registered messages as the registered message data to the terminal 20 (S102).

When the registered message data is received by the terminal 20, the control unit 21 of the terminal 20 displays the registered message objects 42 on the game screen 30 based on the registered message data (S203). Then, the control unit 21 monitors whether or not anyone of the registered messages has been selected (S204). More specifically, the control unit 21 monitors whether or not any one of the registered message objects 42 has been selected.

When any one of the registered messages has been selected, the control unit 21 determines whether or not the selected registered message is an object-related registered message (S205). For example, the control unit 21 determines whether or not a tag is included in the selected registered message. When a tag is included in the selected registered message, the control unit 21 determines that the selected registered message is an object-related registered message. On the other hand, when a tag is not included in the selected registered message, the control unit 21 determines that the selected registered message is not an object-related registered message.

When the selected registered message is not an object-related registered message, the control unit 21 transmits input message data to the server 10 (S208). In this case, the "input message data" is data representing the selected registered message. For example, the registered message ID of the selected registered message is transmitted to the server 10 as the input message data. In this case, the user ID of the user is also transmitted to the server 10.

When the input message data (registered message ID) is received by the server 10, the control unit 11 of the server 10 acquires the message input by the user (S209). For example, the control unit 11 refers to the registered message table, and acquires as the message input by the user the registered message associated with the received registered message ID. Then, the control unit 11 adds and registers the message acquired in Step S209 in the message table (S210).

On the other hand, when it is determined in Step S205 that the selected registered message is an object-related registered message, the control unit 21 displays the markers 44 on the game screen 30 (S206).

For example, the control unit 21 identifies the object type corresponding to the selected registered message (object-related registered message). For example, the object type corresponding to the selected registered message is identified based on the type of the tag included in the registered message. For example, when the <body part> tag is included in the registered message, the object type corresponding to the registered message is identified as being "body part".

The control unit 21 displays the marker 44 associated with the type of the object identified in the manner described above. For example, when the identified object type is "body part", the control unit 21 displays the marker 44 in association with the body part object 33 representing the body part. In this case, the control unit 21 does not display the markers 44 in association with objects not representing a body part. Specifically, the control unit 21 does not display the markers 44 in association with the user object 34 and the item object 36.

After Step S206 has been executed, the control unit 21 monitors whether or not any one of the objects has been selected (S207). More specifically, the control unit 21 monitors whether or not any one of the markers 44 has been selected.

When any one of the objects has been selected, the control unit 21 transmits the input message data to the server 10 (S208). For example, the "input message data" in this case is data representing both the selected registered message and the selected object. For example, a combination of the registered message ID of the selected registered message and the object ID of the selected object is transmitted to the server 10 as the input message data. In this case, the user ID of the user is also transmitted to the server 10.

When the input message data (registered message ID and object ID) is received by the server 10, the control unit 11 of the server 10 acquires the message input by the user (S209).

For example, the control unit 11 refers to the registered message table, and acquires the registered message associated with the received registered message ID. The control unit 11 also refers to the object table, and acquires the object name associated with the received object ID. Further, the control unit 11 replaces the tag included in the acquired registered message with the acquired object name. The control unit 11 acquires the message obtained in this manner as the message input by the user.

Then, the control unit 11 adds and registers the message acquired in Step S209 in the message table (S210).

After Step S210 has been executed, the control unit 11 transmits message object data to the terminal 20 (S211). The "message object data" is the data required in order to display the message object 48 representing the message acquired in Step S209. Further, although omitted from FIG. 14, the message object data is not only transmitted to the terminal 20 of the user who input the message, but the message object data is also transmitted to the terminals 20 of the other users. At each terminal 20, the message object 48 representing the message acquired in Step S209 is displayed on the game screen 30 based on the message object data (S212).

According to the message system 1 described above, the user can input a message having content matching the current situation. For example, in a situation in which the left arm of the enemy needs to be attacked, the user can input a message calling for other users to attack the left arm of the enemy. More specifically, according to the message system 1, flexibility relating to the content of the message can be ensured.

Further, according to the message system 1, the user can input a message matching the current situation such as that described above by selecting the registered message and the object. For example, in the case of the example illustrated in FIG. 2 to FIG. 5, the user can input a message calling for other users to attack the left arm of the enemy by selecting the registered message object 42A and the body part object 33B (marker 44B). In other words, the user can input messages like those described above without typing the messages every occasion. More specifically, according to the message system 1, the time taken to input a message such as that described above can be shortened.

Thus, according to the message system 1, the time taken to input a message can be shortened while ensuring flexibility relating to the content of the message.

In the message system 1, the marker 44 is displayed in association with only the object of the type corresponding to the registered message selected by the user. According to the message system 1, an erroneous selection by the user of an object that does not match the content of the registered message selected by the user can be avoided.

Further, with the message system 1, the user can freely set the registered message (message content, tag position, and tag type). According to the message system 1, the user can predict the situation when the message is to be input, and set the content of the message registered in advance to be desired content matching that situation.

The present invention is not limited to the embodiment described above.

MODIFIED EXAMPLE 1

The registered message selection reception unit 88 may also be configured such that, for example, when the user cannot select the body part object 33, such as when the current situation is not a situation in which a battle is being performed with an enemy, the registered messages corresponding to the body parts are not selectable. More specifically, the registered message selection reception unit 88 may be configured such that the registered message objects 42A and 42 are not selectable.

The registered message selection reception unit 88 may also be configured to display, when the user cannot select the body part object 33, the registered messages corresponding to the body parts and the other registered messages in a manner that is distinguishable by the user. More specifically, the registered message selection reception unit 88 may be configured to display the registered message objects 42A and 42B and the registered message objects 42C to 42E in a manner that is distinguishable by the user.

Thus, the registered message selection reception unit 88 may be configured to restrict reception of a selection of a registered message corresponding to an object type that is not selectable by the user.

The registered message selection reception unit 88 may be configured to display the registered messages corresponding to the object types that are selectable by the user and the registered messages corresponding to the object types that are not selectable by the user in a manner that is distinguishable by the user.

As used herein, the expression "object that is selectable by the user" refers to, for example, an object that is displayed on the screen (object displayable on the screen). For example, an object currently displayed on the screen is an "object that is selectable by the user". Further, for example, even if an object is not currently displayed on the screen, an object that is displayed by scrolling (or transitioning) the screen is also an "object that is selectable by the user". On the other hand, an object that is not displayed on the screen even by scrolling the screen is an "object that is not selectable by the user".

When a virtual space viewed from a virtual viewpoint is displayed on the screen, an object arranged in the virtual space is an "object that is selectable by the user", and an object not arranged in the virtual space is an "object that is not selectable by the user".

Further, the expression "object type that is selectable by the user" may refer to only the objects currently displayed on the screen, and an object not currently displayed on the screen may be considered to be an "object type that is selectable by the user". Similarly, the expression "object that is selectable by the user" may refer to only the objects arranged in a field-of-view area of a virtual viewpoint, and an object not arranged in the field-of-view area of the virtual viewpoint may be considered to be an "object that is not selectable by the user".

The meaning of "restrict reception of a selection of a registered message" is not limited to setting a registered message to a non-selectable state. For example, "restrict reception of a selection of a registered message" may refer to setting such that a registered message is not selectable because the registered message is not displayed on the screen. Further, the expression "restrict reception of a selection of an object" may also refer to, for example, denying reception of a selection on the device (computer) side even when the registered message has been selected by the user, or invalidating the selection per se. For example, the expression "restrict reception of a selection of a registered message" may refer to displaying a warning stating that, when a registered message has been selected by the user, this registered message is not selectable.

As used herein, "display a first registered message and a second registered message in a manner that is distinguishable" refers to, for example, displaying the registered messages so that the first registered message and the second registered message can be distinguished by the user. The expression "display a first registered message and a second registered message in a manner that is distinguishable by the user" may include, for example, the following.

(a) A prescribed image (e.g., marker, frame, etc.) is displayed in association with only one of the first registered message and the second registered message, and the prescribed image is not displayed in association with another of the first registered message and the second registered message.

(b) A display mode (color, brightness, size, shape, type, line type, etc.) of a prescribed image (e.g., frame, speech balloon, etc.) to be displayed in association with the first registered message is changed to be different from the display mode of the prescribed image to be displayed in association with the second object.

(c) The display mode (color, brightness, font, etc.) of the first registered message itself is changed to be different from the display mode of the second registered message itself.

(d) The first registered message is displayed in a first prescribed area, and the second registered message is displayed in a second prescribed area different from the first prescribed area.

(e) When the first registered message and the second registered message are to be displayed based on a display order, the display order of the first registered message is set higher than the display order of the second registered message.

With the configuration described above, because reception of a selection of a registered message corresponding to an object type that is not selectable by the user is restricted, an erroneous selection by the user of a registered message having content relating to an object that is not selectable by the user can be avoided. As a result, inputting an improper message can be avoided.

Further, with the configuration described above, because the registered messages corresponding to the object types that are selectable by the user and the registered messages corresponding to the object types that are not selectable by the user are displayed in a manner that is distinguishable by the user, the user can be prompted to select a registered message having content matching an object that can be selected by the user.

MODIFIED EXAMPLE 2

For example, in the embodiment described above, the user first selects anyone of the registered messages, and then selects any one of the objects (refer to FIG. 3 to FIG. 5).

However, the user may first select any one of the objects, and then select any one of the registered messages.

Figure 15:
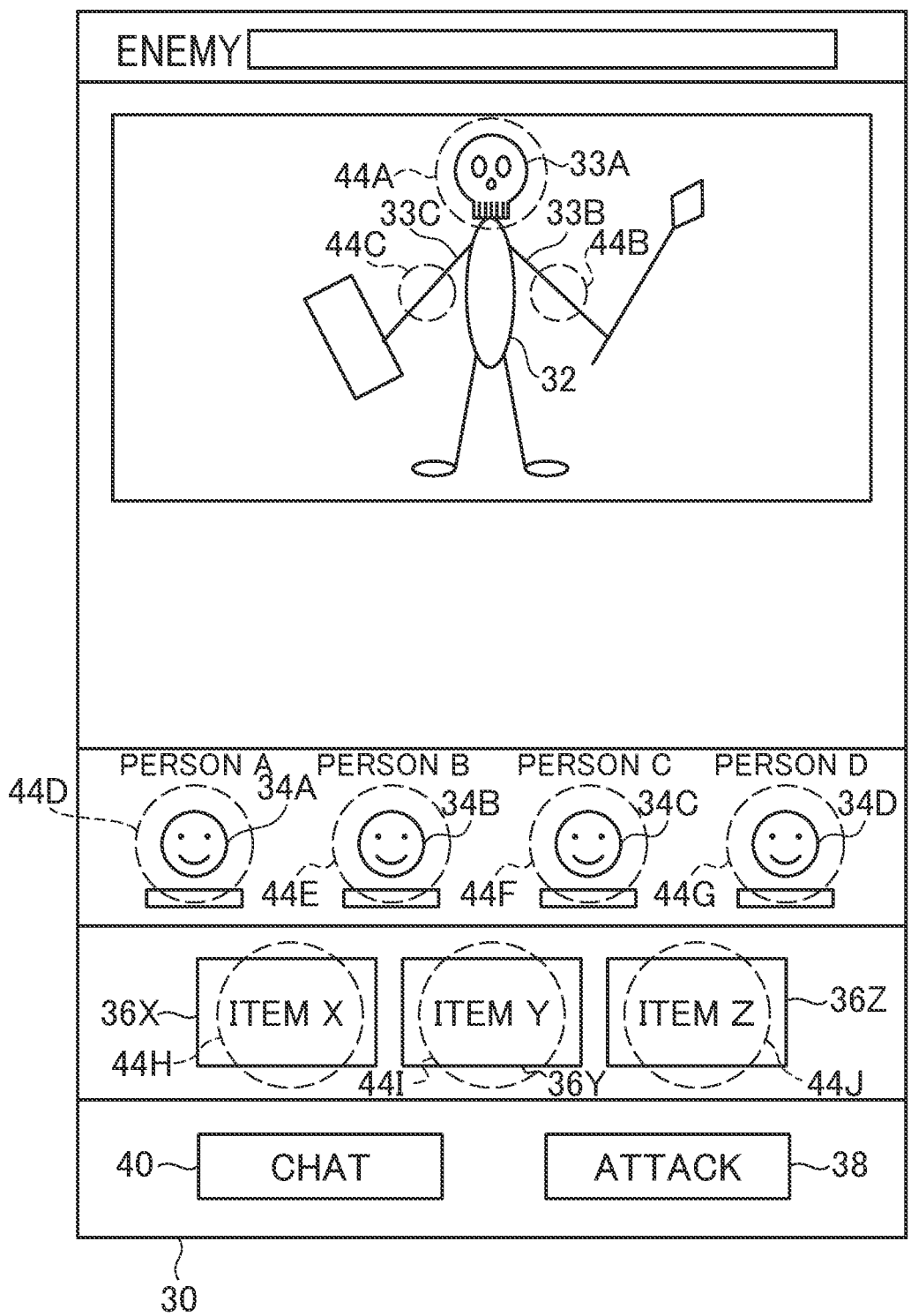
FIG. 15 is a diagram for illustrating an example of the game screen.

For example, when the chat icon 40 of the game screen 30 illustrated in FIG. 2 has been selected, the game screen 30 like that illustrated in FIG. 15 may be displayed. On the game screen 30 illustrated in FIG. 15, markers 44A to 44J are displayed in association with, respectively, the body part objects 33A to 33C, the user objects 34A to 34D, and the item objects 36X to 36Z.

Figure 16:
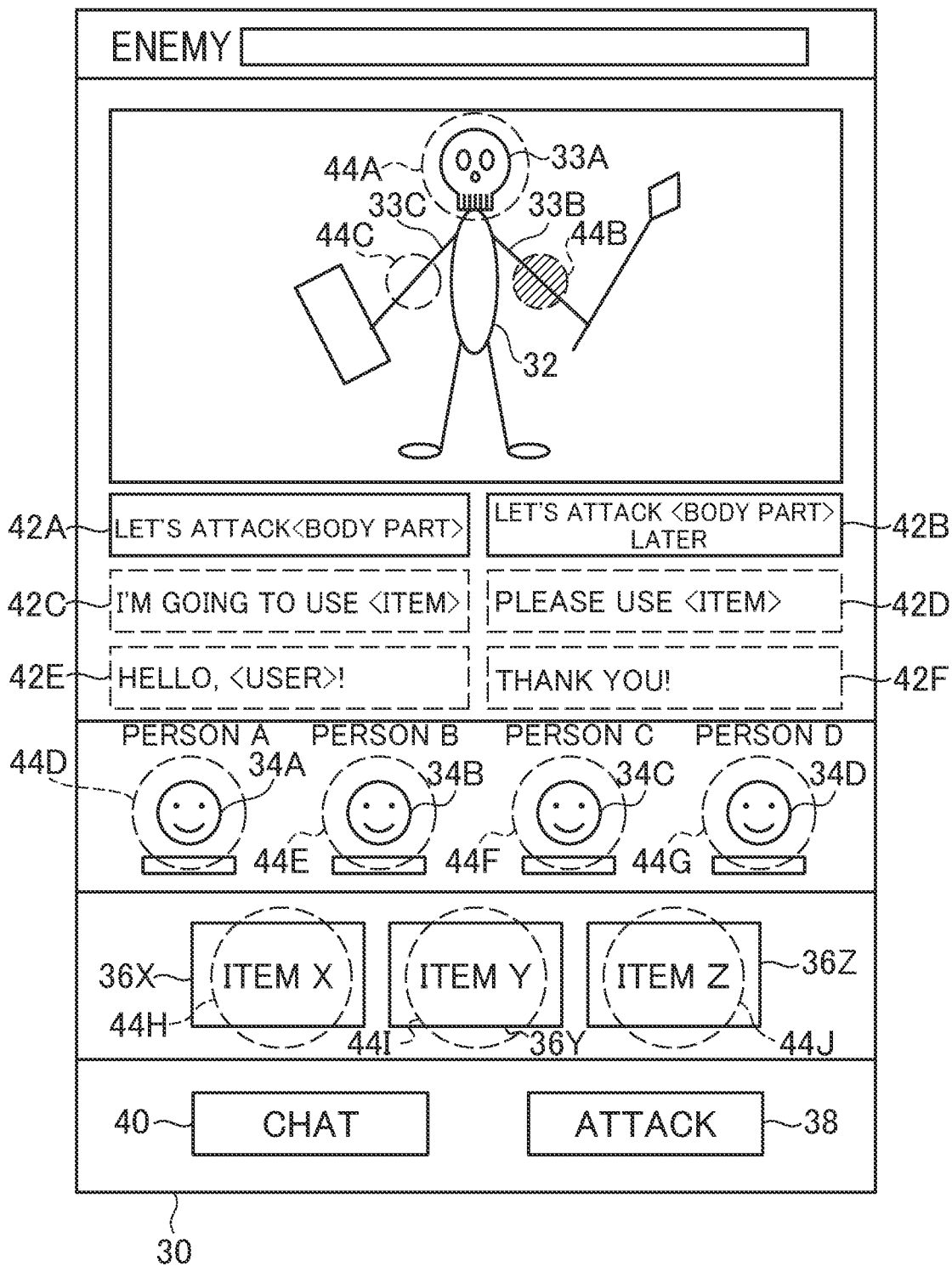
FIG. 16 is a diagram for illustrating an example of the game screen.

In this case, the user selects any one of the objects by selecting any one of the markers 44A to 44J displayed on the game screen 30. In FIG. 16, an example of the game screen 30 when any one of the objects has been selected is illustrated. The registered message objects 42A to 42F respectively representing a plurality of registered messages are displayed on the game screen 30 illustrated in FIG. 16. In FIG. 16, the game screen 30 when the marker 44B has been selected (i.e., when the body part object 33B representing the left arm has been selected) is illustrated.

On the game screen 30 illustrated in FIG. 16, the registered message corresponding to the object type selected by the user and the other registered messages may be displayed in a manner that is distinguishable by the user.

For example, when the body part object 33 has been selected by the user, the registered message objects 42A and 42B representing the registered messages corresponding to a body part and the other registered message objects 42C to 42F may be displayed in a manner that is distinguishable by the user. For example, as illustrated in FIG. 16, the registered message objects 42A and 42B may be displayed by the solid lines, and the registered message objects 42C to 42F may be displayed by the dotted lines.

Further, on the game screen 30 illustrated in FIG. 16, reception of a selection of a registered message other than the registered message corresponding to the object type selected by the user may be restricted.

For example, the message system 1 may be configured such that, when the body part object 33 has been selected by the user, only any one of the registered message objects 42A and 42B representing a registered message corresponding to a body part is selectable, and the registered message object 42C to 42F are not selectable.

With such a configuration, because reception of a selection of a registered message corresponding to the object type selected by the user is restricted, an erroneous selection by the user of a registered message having content that does not match the object selected by the user can be avoided. As a result, the input of an improper message can be avoided.

Further, with such a configuration, because the registered message corresponding to the object type selected by the user and the other registered messages are displayed in a manner that is distinguishable by the user, the user can be prompted to select a registered message having content matching the object selected by the user.

MODIFIED EXAMPLE 3

For example, the message object 48 illustrated in FIG. 6 may be displayed in association with the body part object 33B representing the left arm. The message object 48 illustrated in FIG. 6 represents a message obtained by replacing the <body part> tag included in the registered message represented by the registered message object 42A with the object name (left arm) of the body part object 33B. As a result, the message object 48 illustrated in FIG. 6 may be displayed in association with the body part object 33B representing the left arm.

Figure 17:
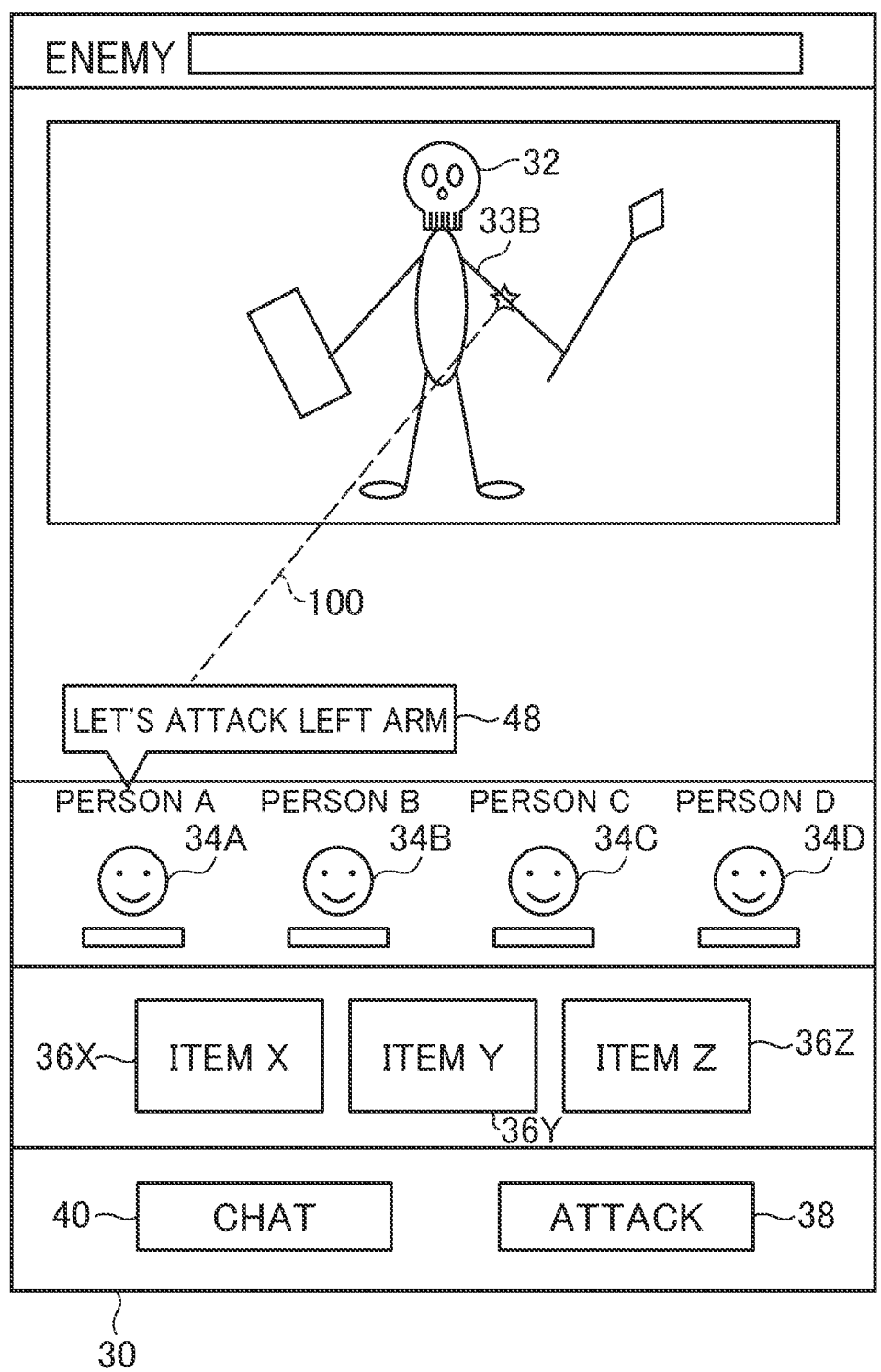
FIG. 17 is a diagram for illustrating an example of the game screen.

In FIG. 17, an example of the game screen 30 in such a case is illustrated. On the game screen 30 illustrated in FIG. 17, a line 100 (dotted line) connecting the message object 48 and the body part object 33B is displayed. Through the display of such a line 100, the user can grasp at a glance that the message represented by the message object 48 is associated with the left arm.

Therefore, the message object display control unit 98 may be configured to perform, when showing a message obtained by replacing the prescribed portion of the registered message with the symbol string associated with the object selected by the user, or a message obtained by inserting the symbol string associated with the object selected by the user into the prescribed position of the registered message, control for causing the message object 48 to be displayed in association with the selected object.

As used herein, the expression "display the message object in association with the object" refers to displaying the message object in a manner that allows the user to grasp that the message object is associated with the object. For example, the expression "display the message object in association with the object" refers to, as illustrated in FIG. 17, a line or an image associating the message object and the object.

With such a configuration, because the message object 48 displayed on the game screen 30 is displayed in association with an object displayed on the game screen 30, the user can easily grasp the object that the message represented by the message object 48 is associated with.

MODIFIED EXAMPLE 4

For example, Step S209 of FIG. 14 may be executed on the terminal 20 side. More specifically, Step S209 may be executed before Step S208 is executed.

For example, when it is determined in Step S207 that any one of the objects has been selected, the control unit 21 of the terminal 20 may acquire the registered message associated with that object as the message input by the user. In this case, for example, the object table is stored in the storage unit 22 in advance. The control unit 21 refers to the object table stored in the storage unit 22, and acquires the object name associated with the object selected in Step S207. Then, the control unit 21 replaces the tag included in the registered message selected in Step S204 with the acquired object name. The control unit 21 acquires the message obtained in this manner as the message input by the user. The control unit 21 then transmits the input message data representing that message to the server 10 (S208).

Further, for example, when it is determined in Step S205 that the registered message selected in Step S204 is not an object-related registered message, the control unit 21 may acquire the registered message selected in Step S204 as the message input by the user. In this case, the control unit 21 transmits the input message data representing that message to the server 10 (S208).

Figure 18:
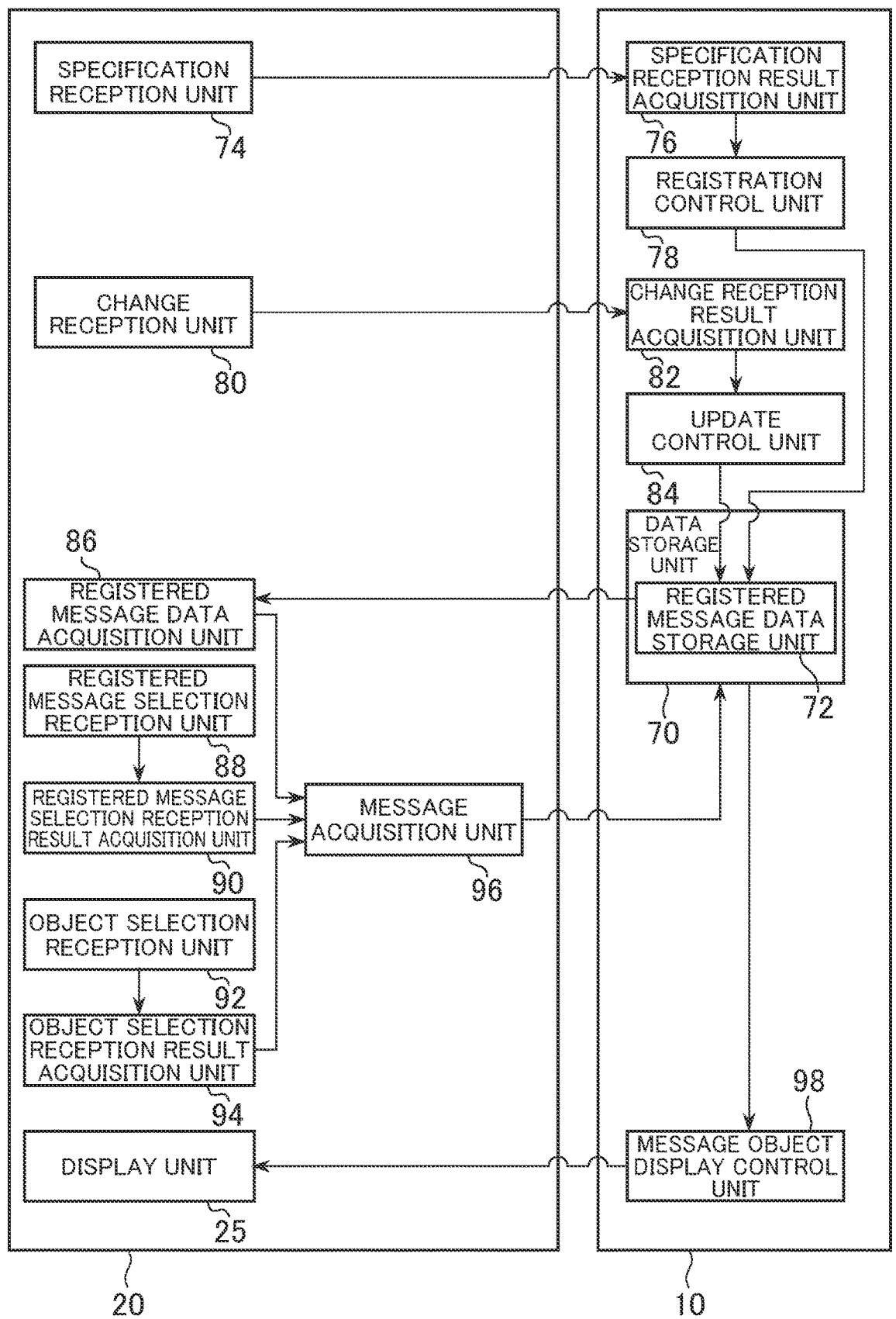
FIG. 18 is a function block diagram of the message system.

A function block diagram of such a case is illustrated in FIG. 18. As illustrated in FIG. 18, the registered message data acquisition unit 86, the registered message selection reception result acquisition unit 90, the object selection reception result acquisition unit 94, and the message acquisition unit 96 are implemented by the control unit 21 of the terminal 20 (message input reception device).

MODIFIED EXAMPLE 5

In Modified Example 4, the registered message data storage unit 72 may be implemented by the terminal 20

(message input reception device). For example, the registered messages of the user A may be stored in the storage unit 22 of the terminal 20 of the user A.

In this case, the specification reception result acquisition unit 76, the registration control unit 78, the change reception result acquisition unit 82, and the update control unit 84 may also be implemented by the terminal 20 (message input reception device).

Because the message object 48 is displayed on the display unit 25 by the control unit 21 of the terminal 20, the message object display control unit 98 may be considered as being implemented by the terminal 20 (message input reception device).

OTHER MODIFIED EXAMPLES

For example, in the embodiment described above, the tag included in the registered message selected by the user is replaced by the name of the object acquired by the user. However, the name of the object acquired by the user may be inserted before or after the tag included in the registered message selected by the user. In this case, the tag remains in the message, but the message system 1 may be configured such that the tag is ignored when displaying the message object 48. In other words, the message system 1 may be configured so as to not display the tag when displaying the message object 48.

The message system 1 may also be configured such that a plurality of markers 44 (i.e., plurality of body part objects 33) can be selected on the game screen 30 illustrated in FIG. 4.

The message system 1 may also be configured such that only one marker 44 is displayed on the game screen 30 illustrated in FIG. 4. For example, the message system 1 may be configured such that only one of the objects selectable by the user is displayed on the game screen 30.

It is not always necessary for the marker 44 to be displayed on the game screen 30 illustrated in FIG. 4. For example, the message system 1 may be configured such that anyone of a plurality of body part objects 33 is specified by the user on the game screen 30 illustrated in FIG. 4.

It is not always necessary for the registered messages to be set for each user. For example, registered messages shared by all the users may be set in advance. In this case, the specification reception unit 74, the specification reception result acquisition unit 76, the registration control unit 78, the change reception unit 80, the change reception result acquisition unit 82, and the update control unit 84 may be omitted.

On the game screen 30 illustrated in FIG. 6, the message object 48 representing the message input by the user is displayed. However, a message input by the user may be output by using sound. In this case, the data for outputting the message input by the user by using sound may be generated by the terminal 20 of the user who input the message, generated by the server 10, or generated by the terminal 20 outputting the message.

The game to be executed by the message system 1 is not limited to the game described above. For example, a plurality of enemy objects 32 may be displayed on the game screen 30, and the user may select any one of those enemy objects 32 as the attack target. In this case, in place of the <body part> tag, an <enemy> tag may be included in the registered message.

In the above description, a case is described in which a plurality of users chat while playing the game. In other words, a case is described in which the present invention is applied to a game system configured to implement a game that a plurality of users participate in. However, the present invention may be applied to a system other than a game system. More specifically, the present invention may also be applied to a system in which a plurality of users chat without any relation to a game. In other words, the present invention may be applied to various systems in which a user inputs a message addressed to another person.

For example, when the user has selected a building (object) on a map in the real world displayed on the screen, a message in which the name of that building replaces or is inserted into a tag may be input. For example, a registered message (object-related registered message) in which a <place> tag, e.g., "Let's go to <place>!", has been set may be registered. When the user has selected a building A on a map in the real world displayed on the screen, a message "Let's go to <building A>!", in which the <place> tag is replaced by the building name "building A", may be input.

For example, when the user has selected a movie icon (object) displayed on the screen, a message in which the name of that movie has been inserted into a tag or replaces a tag may be input. For example, a registered message (object-related registered message) in which a <movie> tag, e.g., "Have you seen <movie>?", has been set may be registered. When the user has selected a movie icon of a movie A displayed on the screen, a message "Have you seen <movie A>?", in which the <movie> tag has been replaced by the movie name "movie A", may be input.

The program for implementing the function blocks illustrated in FIG. 9 or FIG. 18 may be, for example, a part of an application program (e.g., a game program for executing a game), or may be a separate program from the application program. The program for implementing the function blocks illustrated in FIG. 9 or FIG. 18 may be provided, for example, as middleware for providing a message function to various application programs (e.g., game program). The program for implementing the function blocks illustrated in FIG. 9 or FIG. 18 may also be provided, for example, as a part of the operating system of the server 10 or the terminal 20.

[Supplemental]

Based on the above descriptions, the present invention may be grasped as follows. In the following description, in order to understand the present invention more easily, the reference symbols in the drawings are written in parentheses. However, the present invention is not limited by this to the modes illustrated in the drawings.

A message input reception device (10 or 20) according to one embodiment of the present invention includes at least one processor configured to: acquire registered message data representing an object-related registered message which is registered in advance and is set such that a symbol string relating to at least one object is insertable into a prescribed position or is capable of replacing a prescribed portion; identify at least one selected object which is selected by a user from among objects displayed on a screen; and acquire, as an input message input by the user, a message obtained by inserting a symbol string associated with the at least one selected object into the prescribed position of the object-related registered message or replacing the prescribed portion of the object-related registered message with the symbol string.

A message system (1) according to one embodiment of the present invention includes at least one processor configured to: acquire registered message data representing an object-related registered message which is registered in advance and is set such that a symbol string relating to at least one object is insertable into a prescribed position or is capable of replacing a prescribed portion; identify at least one selected object which is selected by a user from among objects displayed on a screen; and acquire, as an input message input by the user, a message obtained by inserting a symbol string associated with the at least one selected object into the prescribed position of the object-related registered message or replacing the prescribed portion of the object-related registered message with the symbol string.

A program according to one embodiment of the present invention is a program for causing a computer to function as the message input reception device (10 or 20) described above or as the message system (1) described above.

An information storage medium according to one embodiment of the present invention is a computer-readable information storage medium having the program described above recorded thereon.

According to one aspect of the present invention, the registered message data includes insertion position information representing an insertable position of the symbol string in the object-related registered message or replacement portion information representing a replaceable portion of the symbol string in the object-related registered message, and the at least one processor is configured to acquire a message obtained by inserting the symbol string into the insertable position represented by the insertion position information in the object-related registered message or by replacing the replaceable portion represented by the replacement portion information in the object-related registered message with the symbol string.

According to one aspect of the present invention, the at least one processor is configured to: identify the object-related registered message specified by the user and the insertable position of the symbol string or the replaceable portion of the symbol string; and register the registered message data which is representing the object-related registered message specified by the user and comprises the insertion position information representing the insertable position specified by the user or the replacement portion information representing the replaceable portion specified by the user.

According to one aspect of the present invention, the at least one processor is configured to: identify the object-related registered message changed by the user and the insertion position information changed by the user or the replacement portion information changed by the user; and update the registered message data based on the change result by the user.

According to one aspect of the present invention: the registered message data represents a plurality of registered messages registered in advance, at least one of the plurality of registered messages includes the object-related registered message, and the at least one processor being configured to: identify any one of the plurality of registered messages selected by the user; and if the object-related registered message has been selected by the user, the at least one processor being configured to acquire the input message by inserting a symbol string associated with the at least one selected object into the prescribed position of the object-related registered message selected by the user or replacing the prescribed portion of the object-related registered message selected by the user with the symbol string.

According to one aspect of the present invention, the registered message data includes object type information capable of identifying an object type corresponding to the object-related registered message, and the at least one processor is configured to restrict reception of a selection of an object other than of a type corresponding to the object-related registered message selected by the user.

According to one aspect of the present invention, the registered message data includes object type information capable of identifying an object type corresponding to the object-related registered message, and the at least one processor is configured to display an object of a type corresponding to the object-related registered message selected by the user among objects displayed on the screen and other objects in a manner that is distinguishable by the user.

According to one aspect of the present invention, the registered message data includes object type information capable of identifying an object type corresponding to the object-related registered message, and the at least one processor is configured to restrict reception of, among the plurality of registered messages, a selection of a registered message other than the object-related registered message corresponding to a type of the selected object.

According to one aspect of the present invention, the registered message data includes object type information capable of identifying an object type corresponding to the object-related registered message, and the at least one processor is configured to display the object-related registered message corresponding to the type of the selected object among the plurality of registered messages and other registered messages in a manner that is distinguishable by the user.

According to one aspect of the present invention: the registered message data includes object type information capable of identifying an object type corresponding to the object-related registered message, and the at least one processor is configured to: identify the object-related registered message selected by the user; acquire the input message by inserting a symbol string associated with at least one selected object into the prescribed position of the object-related registered message selected by the user or replacing the prescribed portion of the object-related registered message selected by the user with the symbol string; and restrict a selection of an object-related registered message corresponding to an object type that is not selectable by the user.

According to one aspect of the present invention: the registered message data includes object type information capable of identifying an object type corresponding to the object-related registered message, and the at least one processor being configured to: identify the object-related registered message selected by the user; acquire the input message by inserting a symbol string associated with at least one selected object into the prescribed position of the object-related registered message selected by the user or replacing the prescribed portion of the object-related registered message selected by the user with the symbol string; and display the object-related registered message corresponding to an object type that is selectable by the user and the object-related registered messages corresponding to an object type that is not selectable by the user in a manner that is distinguishable by the user.

According to one aspect of the present invention, the at least one processor is configured to: display a message object representing the input message on a screen; and display, in association with the selected object, a message object representing a message obtained by inserting a symbol string associated with the selected object into the prescribed position of the object-related registered message or replacing the prescribed portion of the object-related registered message selected by the user with the symbol string.

What is claimed is:

1. A message input reception device, comprising at least one processor configured to:
   acquire registered message data representing an object-related registered message which is registered in advance and is set such that a symbol string relating to at least one object is insertable into a prescribed position or is capable of replacing a prescribed portion, the at least one object being at least one attack target, wherein the at least one attack target is a body part of an enemy object in a video game;
   identify at least one selected object which is selected by a user from among objects displayed on a screen based on a process of the video game; and
   acquire, as an input message input by the user, a message obtained by inserting a symbol string that indicates the at least one selected object into the prescribed position of the object-related registered message or replacing the prescribed portion of the object-related registered message with the symbol string, the symbol string indicating at least one name of the body part selected by the user;
   wherein the prescribed position is determined for each object-related registered message.

2. The message input reception device according to claim 1,
   the registered message data comprising insertion position information representing an insertable position of the symbol string in the object-related registered message or replacement portion information representing a replaceable portion of the symbol string in the object-related registered message, and
   the at least one processor being configured to acquire a message obtained by inserting the symbol string into the insertable position represented by the insertion position information in the object-related registered message or by replacing the replaceable portion represented by the replacement portion information in the object-related registered message with the symbol string.

3. The message input reception device according to claim 2, the at least one processor being configured to:
   identify the object-related registered message specified by the user and the insertable position of the symbol string or the replaceable portion of the symbol string; and
   register the registered message data which is representing the object-related registered message specified by the user and comprises the insertion position information representing the insertable position specified by the user or the replacement portion information representing the replaceable portion specified by the user.

4. The message input reception device according to claim 2, the at least one processor being configured to:
   identify the object-related registered message changed by the user and the insertion position information changed by the user or the replacement portion information changed by the user; and
   update the registered message data based on the change result by the user.

5. The message input reception device according to claim 1,
   the registered message data representing a plurality of registered messages registered in advance,
   at least one of the plurality of registered messages comprising the object-related registered message, and
   the at least one processor being configured to:
   identify any one of the plurality of registered messages selected by the user; and
   if the object-related registered message has been selected by the user, the at least one processor being configured to acquire the input message by inserting a symbol string associated with the at least one selected object into the prescribed position of the object-related registered message selected by the user or replacing the prescribed portion of the object-related registered message selected by the user with the symbol string.

6. The message input reception device according to claim 5,
   the registered message data comprising object type information capable of identifying an object type corresponding to the object-related registered message, and
   the at least one processor being configured to restrict reception of a selection of an object other than of a type corresponding to the object-related registered message selected by the user.

7. The message input reception device according to claim 5,
   the registered message data comprising object type information capable of identifying an object type corresponding to the object-related registered message, and
   the at least one processor being configured to display an object of a type corresponding to the object-related registered message selected by the user among objects displayed on the screen and other objects in a manner that is distinguishable by the user.

8. The message input reception device according to claim 5,
   the registered message data comprising object type information capable of identifying an object type corresponding to the object-related registered message, and
   the at least one processor being configured to restrict reception of, among the plurality of registered messages, a selection of a registered message other than the object-related registered message corresponding to a type of the selected object.

9. The message input reception device according to claim 5,
   the registered message data comprising object type information capable of identifying an object type corresponding to the object-related registered message, and
   the at least one processor being configured to display the object-related registered message corresponding to the type of the selected object among the plurality of registered messages and other registered messages in a manner that is distinguishable by the user.

10. The message input reception device according to claim 1,
    the registered message data comprising object type information capable of identifying an object type corresponding to the object-related registered message, and
    the at least one processor being configured to:
    identify the object-related registered message selected by the user;
    acquire the input message by inserting a symbol string associated with at least one selected object into the prescribed position of the object-related registered message selected by the user or replacing the prescribed portion of the object-related registered message selected by the user with the symbol string; and
    restrict a selection of an object-related registered message corresponding to an object type that is not selectable by the user.

11. The message input reception device according to claim 1,
the registered message data comprising object type information capable of identifying an object type corresponding to the object-related registered message, and
the at least one processor being configured to:
identify the object-related registered message selected by the user;
acquire the input message by inserting a symbol string associated with at least one selected object into the prescribed position of the object-related registered message selected by the user or replacing the prescribed portion of the object-related registered message selected by the user with the symbol string; and
display the object-related registered message corresponding to an object type that is selectable by the user and the object-related registered messages corresponding to an object type that is not selectable by the user in a manner that is distinguishable by the user.

12. The message input reception device according to claim 1, the at least one processor being configured to:
display a message object representing the input message on a screen; and
display, in association with the selected object, a message object representing a message obtained by inserting a symbol string associated with the selected object into the prescribed position of the object-related registered message or replacing the prescribed portion of the object-related registered message selected by the user with the symbol string.

13. The message input reception device according to claim 1, wherein the at least one object is at least one predetermined object from among objects displayed on the screen based on the video game process.

14. The message input reception device according to claim 1, wherein:
the video game is played by the user and another user,
the at least one processor sends the acquired message to another user's terminal, and
the acquired message is displayed on another user's terminal.

15. A message system method, comprising the steps of:
acquiring registered message data representing an object-related registered message which is registered in advance and is set such that a symbol string relating to at least one object is insertable into a prescribed position or is capable of replacing a prescribed portion, the at least one object being at least one attack target, wherein the at least one attack target is a body part of an enemy object in a video game;
identifying at least one selected object which is selected by a user from among objects displayed on a screen based on a process of the video game; and
acquiring, as an input message input by the user, a message obtained by inserting a symbol string that indicates the at least one selected object into the prescribed position of the object-related registered message or replacing the prescribed portion of the object-related registered message with the symbol string, the symbol string indicating at least one name of the body part selected by the user;
wherein the prescribed position is determined for each object-related registered message.

16. A non-transitory computer-readable information storage medium having a program for causing a computer to:
acquire registered message data representing an object-related registered message which is registered in advance and is set such that a symbol string relating to at least one object is insertable into a prescribed position or is capable of replacing a prescribed portion, the at least one object being at least one attack target, wherein the at least one attack target is a body part of an enemy object in a video game;
identify at least one selected object which is selected by a user from among objects displayed on a screen based on a process of the video game; and
acquire, as an input message input by the user, a message obtained by inserting a symbol string that indicates the at least one selected object into the prescribed position of the object-related registered message or replacing the prescribed portion of the object-related registered message with the symbol string, the symbol string indicating at least one name of the body part selected by the user;
wherein the prescribed position is determined for each object-related registered message.

* * * * *